United States Patent
Yoon et al.

(10) Patent No.: US 10,570,311 B2
(45) Date of Patent: Feb. 25, 2020

(54) LAMINATE AND METHOD FOR PRODUCING SAME

(71) Applicant: DONGJIN SEMICHEM CO., LTD., Incheon (KR)

(72) Inventors: Young Min Yoon, Siheung-si (KR); Ho Jong Kim, Siheung-si (KR); Sung Hyun Lee, Siheung-si (KR); Sung Gun Shin, Siheung-si (KR)

(73) Assignee: DONGJIN SEMICHEM CO., LTD., Incheon (KR)

( * ) Notice: Subject to any disclaimer, the term of this patent is extended or adjusted under 35 U.S.C. 154(b) by 138 days.

(21) Appl. No.: 15/754,637

(22) PCT Filed: Aug. 25, 2016

(86) PCT No.: PCT/KR2016/009470
§ 371 (c)(1),
(2) Date: Feb. 23, 2018

(87) PCT Pub. No.: WO2017/034357
PCT Pub. Date: Feb. 3, 2017

(65) Prior Publication Data
US 2018/0237658 A1 Aug. 23, 2018

(30) Foreign Application Priority Data
Aug. 25, 2015 (KR) ........................ 10-2015-0119375

(51) Int. Cl.
| | | |
|---|---|---|
| C09D 183/04 | (2006.01) | |
| B05D 7/02 | (2006.01) | |
| C09D 183/06 | (2006.01) | |
| B05D 7/00 | (2006.01) | |
| C08G 77/14 | (2006.01) | |
| C08G 77/00 | (2006.01) | |
| C08G 77/20 | (2006.01) | |
| B05D 3/02 | (2006.01) | |
| B05D 3/06 | (2006.01) | |

(52) U.S. Cl.
CPC ............ *C09D 183/04* (2013.01); *B05D 7/02* (2013.01); *B05D 7/54* (2013.01); *C09D 183/06* (2013.01); *B05D 3/0254* (2013.01); *B05D 3/067* (2013.01); *B05D 2201/02* (2013.01); *B05D 2518/12* (2013.01); *B05D 2701/30* (2013.01); *C08G 77/14* (2013.01); *C08G 77/20* (2013.01); *C08G 77/80* (2013.01)

(58) Field of Classification Search
CPC ... C09D 183/04; C03C 17/32; C03C 17/3405; C03C 17/30; B05D 5/00; B05D 7/04; B05D 7/57; B05D 7/52; B05D 7/53; B05D 2203/35; B05D 2203/20; B05D 2201/00; C08J 7/042; C08J 2483/04; C08J 2369/00
See application file for complete search history.

(56) References Cited

U.S. PATENT DOCUMENTS

| | | |
|---|---|---|
| 2013/0072609 A1 | 3/2013 | Haddad et al. |
| 2014/0050909 A1* | 2/2014 | Choi .................... B32B 7/12 |
| | | 428/217 |

FOREIGN PATENT DOCUMENTS

| | | |
|---|---|---|
| JP | 2008-037101 | 2/2008 |
| JP | 2014-000801 | 1/2014 |
| KR | 10-2006-0121334 | 11/2006 |
| KR | 10-2011-0014517 | 2/2011 |
| KR | 10-1249798 | 4/2013 |
| KR | 10-2013-0100345 | 9/2013 |
| KR | 10-2015-0075549 | 7/2015 |
| WO | 2013-111990 | 8/2013 |

OTHER PUBLICATIONS

KIPO, PCT Search Report & Written Opinion of Application No. PCT/KR2016/009470 dated Jan. 13, 2017.

* cited by examiner

*Primary Examiner* — Robert S Jones
(74) *Attorney, Agent, or Firm* — Lex IP Meister, PLLC

(57) ABSTRACT

The present invention relates to a laminate including a coating layer, which includes an Si—O group-containing material and an intermediate interface layer, and to a method for producing the same, and more specifically, to a laminate which includes an intermediate interface layer, which is a mixture of materials constituting a substrate and materials constituting a coating layer, between the substrate and the coating layer, which includes an Si—O group-containing material, and thus can significantly improve bending capabilities, transparency, and adhesion between the substrate and the coating layer, and further enhances scratch resistance, water repellent properties, anti-fouling properties, fingerprint resistance, thermal stability, gloss properties, and surface hardness by a silsesquioxane coating, and a method for producing the laminate.

18 Claims, 2 Drawing Sheets

LAMINATE AND METHOD FOR PRODUCING SAME

TECHNICAL FIELD

The present invention relates to a laminate and a method for producing the same, and more particularly, to a laminate including an intermediate interface layer which is formed of a mixture of materials constituting a substrate and materials constituting a coating layer, between the substrate and the coating layer that includes an Si—O group-containing material, and thus significantly improves bending capabilities, transparency, and adhesion between the substrate and the coating layer and further enhances scratch resistance of a substrate due to a silsesquioxane coating, water repellent properties, anti-fouling properties, fingerprint resistance, thermal stability, gloss properties, and surface hardness, and a method for producing the same.

BACKGROUND ART

In general, a plastic material is being applied to many products due to high workability and flexibility. However, the plastic material has deteriorated surface hardness, durability, fouling resistance, scratch resistance, gloss properties, and heat resistance, and thus needs to be double- or triple-coated with various coating materials on the surface in order to apply functionality depending on use of a plastic product.

For example, Korean Patent Publication No. 10-2006-0121334 relates to technology for forming an organic passivation film on a plastic surface and a metal passivation film at its outside, physically molding all the plastics in a vacuum chamber, again forming an organic passivation film on the surface and a metal passivation film at its outside, and realizing a variously colorful metal-like texture through physical and chemical deposition in the vacuum chamber, and discloses a method of surface-coating a plastic-molded article which includes: a washing process of washing all kinds of foreign particles remaining on the surface of the plastic-molded article by using compressed air and solvents and then drying it; an organic passivation film-forming process of forming a passivation film by coating an organic material having excellent adherence to an inorganic material and an excellent surface-curing property through spraying or dipping; a mineral passivation film-forming process of forming a passivation film by coating a mineral on the surface-cured plastic molded article through spraying or dipping to suppress elution of gas; and a vacuum-deposition process of forming a metal passivation film through physical and chemical deposition in a vacuum chamber to apply physical and chemical characteristics to the plastic molded article having a composite passivation film of alternative organic/metal passivation films and realize a variously-colorful metal-like texture, but has a problem of an extremely complex process and deteriorated durability and thermal stability of the coating layer. Further, Korean Patent Publication No. 10-2011-0014517 discloses a method of hard-coating a plastic by surface-coating it with a urethane-based polymer having an ethylenic unsaturated group in a molecule, a mass average molecular weight of 3000-200,000 when measured through gel permeation chromatography, and a glass transition temperature of greater than or equal to 30%, and a silica particle having an ethylenic unsaturated group, but still has a problem of insufficient surface hardness, fouling resistance, and thermal stability.

In addition, an attempt to improve surface hardness, fouling resistance, and thermal stability by forming a hard coating layer on a plastic substrate in various methods has been made, but there is a problem of insufficient adherence such as separation on the interface of the substrate, the hard coating layer, and the like, and Korean Patent Publication No. 10-2013-0100345 discloses a method of laminating a polycarbonate resin layer—an adhesive layer—a hard coating layer to form the hard coating layer on a transparent plastic film, but has a problem of a complex process, and has an additional problem of deterioration of properties such as heat resistance, chemical resistance, and the like due to separate formation of the adhesive layer.

DISCLOSURE

Technical Problem

In order to solve the problems, the present invention provides a hard coating laminate that is capable of significantly improving bending capabilities, transparency, and adhesion between the substrate and the coating layer and further enhancing scratch resistance of a substrate due to a silsesquioxane coating, water repellent properties, anti-fouling properties, fingerprint resistance, thermal stability, gloss properties, and surface hardness, by forming an intermediate interface layer between a substrate and a coating layer, and a method for producing the same.

In addition, the present invention provides an article including the laminate.

The present invention provides a laminate that is capable of significantly improving bending capabilities, transparency, and adhesion between the substrate and the coating layer and further enhancing scratch resistance of a substrate due to a silsesquioxane coating, water repellent properties, anti-fouling properties, fingerprint resistance, thermal stability, gloss properties, and surface hardness, by forming an intermediate interface layer between a substrate and a coating layer through a single coating as well as by coating a coating solution on a surface of a substrate, which makes a production process easy, and a method for producing the same.

Technical Solution

In order to accomplish the purposes, the present invention provides a laminate including:

a substrate;

a coating layer including Si—O group-containing material on one surface or both surfaces of the substrate; and an intermediate interface layer between the substrate and the coating layer.

In addition, the present invention provides a method for producing the laminate, including simultaneously forming an intermediate interface layer and a coating layer on one surface or both surfaces of the substrate, through:

(1) coating a Si—O group-containing material on one surface or both surfaces of a substrate; and (2) drying or curing the coated laminate.

Advantageous Effects

A laminate, and a method for producing the same according to the present invention, is capable of significantly improving bending capabilities, transparency, and adhesion between the substrate and the coating layer and further enhancing scratch resistance of a substrate due to a silsesquioxane coating, water repellent properties, anti-fouling properties, fingerprint resistance, thermal stability, gloss properties, and surface hardness, by forming an intermediate interface layer between a substrate and a coating layer through a single coating as well as by coating a coating solution on a surface of a substrate, which makes a production process easy.

MODE FOR INVENTION

Figure 1:
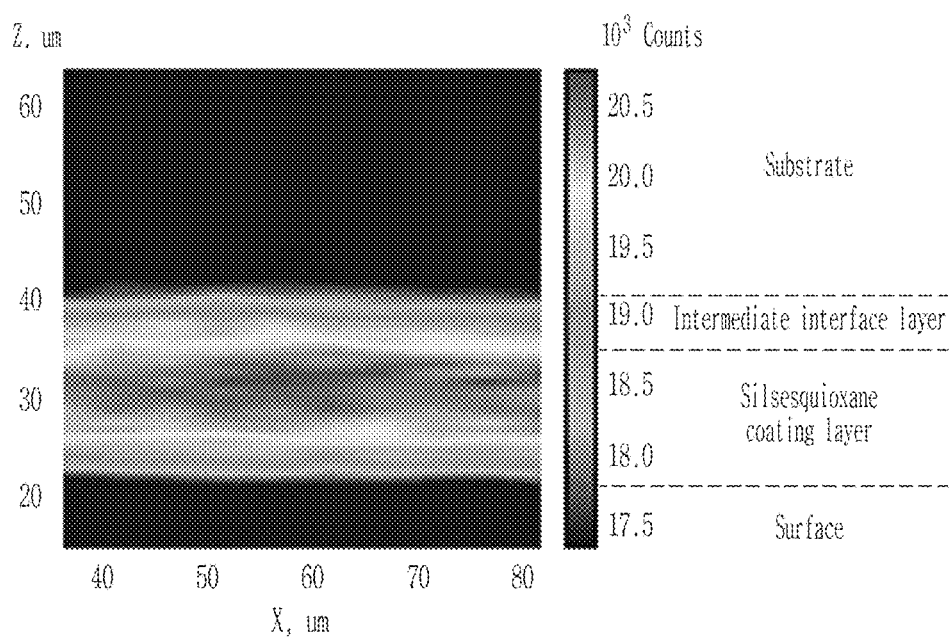
FIG. 1 shows a Raman scattering analysis result based on a hard coating layer in a PC substrate that is hard-coated by forming an intermediate interface layer according to an exemplary embodiment of the present invention.
Figure 2:
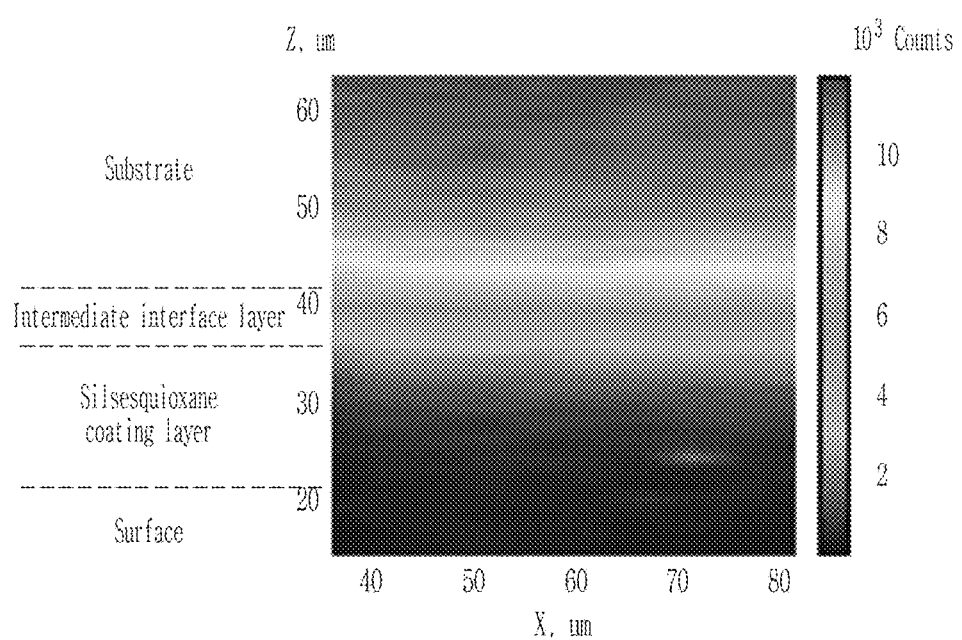
FIG. 2 shows a Raman scattering analysis result based on a substrate in the PC substrate that is hard-coated by forming an intermediate interface layer according to an exemplary embodiment of the present invention.

Hereinafter, exemplary embodiments of the present invention will be described in detail with reference to the accompanying drawings so that a skilled person in the technical field to which the present invention pertains may easily carry out the invention. As those skilled in the art would realize, the described embodiments may be modified in various different ways, all without departing from the spirit or scope of the present invention.

Through the specification, unless explicitly described to the contrary, the word "comprise" and variations such as "comprises" or "comprising" will be understood to imply the inclusion of stated elements but not the exclusion of any other elements.

Hereinafter, the present invention is explained in detail.

A laminate according to the present invention includes a substrate, a coating layer including Si—O group-containing material on one surface or both surfaces of the substrate, and an intermediate interface layer between the substrate and the coating layer.

In the present invention, the substrate may include glass and an organic or inorganic plastic, wherein the plastic is not particularly limited as long as it consists of a plastic, but may be, for example, one or more of polycarbonate (PC), high hardness polycarbonate (high hardness PC), polyethylene (PE), polypropylene (PP), polystyrene (PS), polyethylene terephthalate (PET), polyamide (PA, nylon), polyester (PES), polyvinyl chloride (PVC), polyurethane (PU), polyvinylidene chloride (PVDC), polytetrafluoroethylene (PTFE), polyetheretherketone (PEEK), polyimide (PI), polyetherimide (PEI), acryl, and the like, or a composite plastic including a mixture of a plastic and an inorganic fiber such as a glass fiber or a carbon fiber, and may be applied to all plastic articles including a sheet, a film, an injection product, a sculpture, and a bead, since a solution process is used. Specifically, the plastic may be a polycarbonate (PC) or high hardness polycarbonate (high hardness PC) sheet and film.

In the present invention, the coating layer including a Si—O group-containing material is formed on one surface or both surfaces of the substrate, and specifically, the Si—O group-containing material may include silsesquioxane, and more specifically the silsesquioxane may include a SiOR functional group.

For example, the coating layer may be a silsesquioxane coating layer including a Si—O group-containing material, and specifically, the silsesquioxane may be a silsesquioxane including at least one of

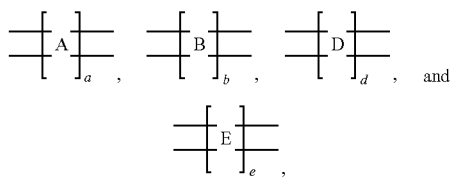

a silsesquioxane including

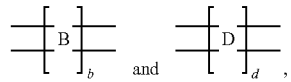

or a silsesquioxane represented by one of Chemical Formulae 1 to 9.

[Chemical Formula 1]
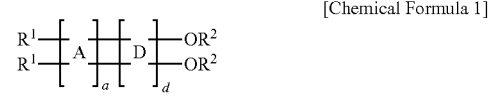

[Chemical Formula 2]
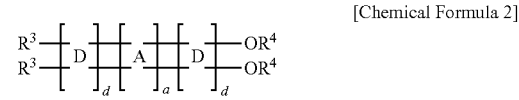

[Chemical Formula 3]
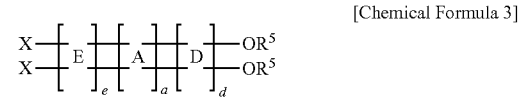

[Chemical Formula 4]
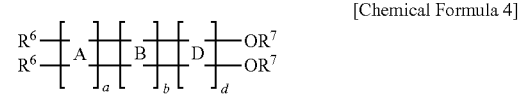

[Chemical Formula 5]
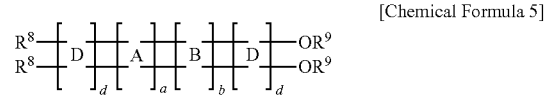

[Chemical Formula 6]
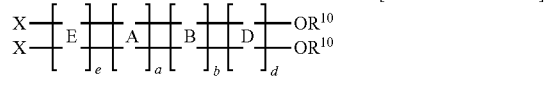

[Chemical Formula 7]
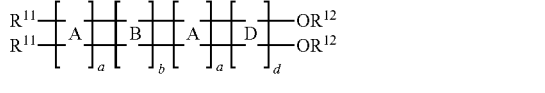

[Chemical Formula 8]
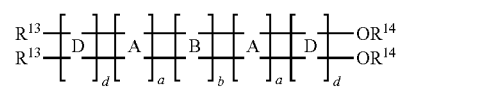

[Chemical Formula 9]
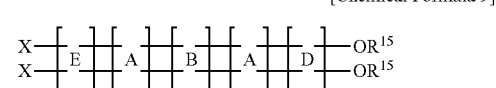

Herein,

A is

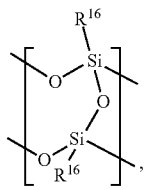

B is

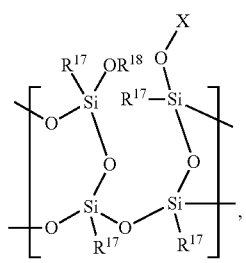

D is

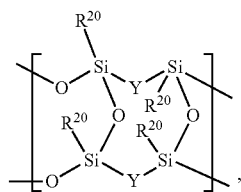

and E is

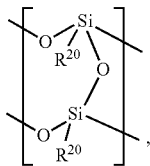

Y is independently O, $NR^{21}$, or $[(SiO_{3/2}R)_{4+2n}O]$, provided that at least one is $[(SiO_{3/2}R)_{4+2n}O]$, X is independently $R^{22}$ or $[(SiO_{3/2}R)_{4+2n}R]$, provided that at least one is $[(SiO_{3/2}R)_{4+2n}R]$, R, $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ are independently hydrogen; deuterium; a halogen; an amine group; an epoxy group; a cyclohexylepoxy group; a (meth)acryl group; a thiol group; an isocyanate group; a nitrile group; a nitro group; a phenyl group; a $C_1$-$C_{40}$ alkyl group, a $C_2$-$C_{40}$ alkenyl group, a $C_1$-$C_{40}$ alkoxy group, a $C_3$-$C_{40}$ cycloalkyl group, a $C_3$-$C_{40}$ heterocycloalkyl group, a $C_6$-$C_{40}$ aryl group, a $C_3$-$C_{40}$ heteroaryl group, a $C_3$-$C_{40}$ aralkyl group, a $C_3$-$C_{40}$ aryloxy group, or a $C_3$-$C_{40}$ arylthiol group that are substituted or unsubstituted with hydrogen, deuterium, a halogen, an amine group, an epoxy group, a (meth)acryl group, a thiol group, an isocyanate group, a nitrile group, a nitro group, or a phenyl group, a and d are independently an integer ranging from 1 to 100,000, specifically, a is 3 to 1000 and d is 1 to 500, more specifically, a is 5 to 300 and d is 2 to 100, b is independently an integer ranging from 1 to 500, e is independently 1 or 2, and specifically 1, and n is independently an integer ranging from 1 to 20, and specifically 3 to 10. Although not indicated above, known chain units applicable to the silsesquioxane composite polymer may be further included between each chain unit.

The silsesquioxane composite polymer represented by Chemical Formula 1 may be produced by:

a first step of mixing a basic catalyst and an organic solvent in a reactor, adding an organic silane compound thereto, and performing condensation to produce a compound of Chemical Formula 10; after the first step, a second step of adding an acidic catalyst to the reactor and adjusting a reaction solution to be acidic in order to introduce a [D]d(OR2)2 structure to the compound of Chemical Formula 10, adding an organic silane compound, and stirring the same; and after the second step, a third step of adding a basic catalyst to the reactor to convert the reaction solution to be basic and performing a condensation reaction.

[Chemical Formula 10]

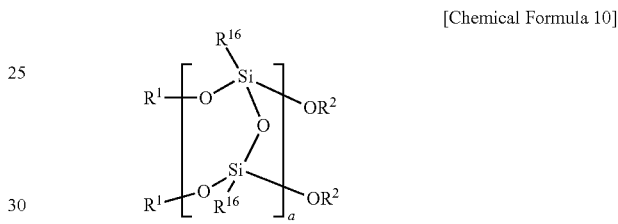

Herein, in Chemical Formula 10, $R^1$, $R^2$, $R^{16}$, D, a, and d are the same as defined in Chemical Formulae 1 to 9.

The silsesquioxane composite polymer represented by Chemical Formula 2 of the present invention may be produced by:

a first step of mixing a basic catalyst and an organic solvent in a reactor, adding an organic silane compound thereto, and performing condensation to produce a compound of Chemical Formula 10; after the first step, a second step of adding an acidic catalyst to the reactor and adjusting a reaction solution to be acidic in order to introduce [D]d(OR3)2 and [D]d(OR4)2 structures to the compound of Chemical Formula 10 as in Chemical Formula 2, adding an excess amount of an organic silane compound, and stirring the same; after the second step, a third step of adding a basic catalyst to the reactor to convert the reaction solution to be basic and performing a condensation reaction; and a purifying step of removing a singular cage structure that is a byproduct through the third step reaction through recrystallization.

The silsesquioxane composite polymer represented by Chemical Formula 3 of the present invention may be produced by:

a first step of mixing a basic catalyst and an organic solvent in a reactor, adding an organic silane compound thereto, and performing condensation to produce a compound of Chemical Formula 10; a second step of adding an acidic catalyst to the reactor and adjusting a reaction solution to be acidic in order to introduce a [D]d(OR5)2 structure to the compound of Chemical Formula 10, adding an organic silane compound, and stirring the same; after the second step, a third step of adding a basic catalyst to the reactor to convert the reaction solution to be basic and to perform a condensation reaction; and after the third step, a fourth step of adding an acidic catalyst to the reactor in order to introduce an [E]eX2 structure to the terminal end of the composite polymer and thus converting the reaction solution into an acidic solution, mixing the resultant with an organic silane compound, and stirring the same.

The silsesquioxane composite polymer represented by Chemical Formula 4 of the present invention may be produced by:

a first step of mixing a basic catalyst and an organic solvent in a reactor, adding an organic silane compound thereto, and controlling a condensation degree to produce a compound of Chemical Formula 10; after the first step, a second step of adding an acidic catalyst to the reactor and adjusting a reaction solution to be acidic in order to introduce a [B]b structure and a [D]d(OR7)2 structure to the compound of Chemical Formula 10, adding an organic silane compound, and stirring the same; and after the second step, a third step of adding a basic catalyst to the reactor to convert the reaction solution to be basic and performing a condensation reaction.

The silsesquioxane composite polymer represented by Chemical Formula 5 of the present invention may be produced by:

a first step of mixing a basic catalyst and an organic solvent in a reactor, adding an organic silane compound thereto, and performing condensation to produce a compound of Chemical Formula 10; after the first step, a second step of adding an acidic catalyst to the reactor and adjusting a reaction solution to be acidic in order to introduce a [B]b structure and [D]d(OR8)2 and [D]d(OR9)2 structures to the compound of Chemical Formula 10, adding an excess amount of an organic silane compound, and stirring the same; after the second step, a third step of adding a basic catalyst to the reactor to convert the reaction solution to be basic and performing a condensation reaction; and after the third step, a fourth step of removing a singular cage-producing structure through recrystallization and filtering.

The silsesquioxane composite polymer represented by Chemical Formula 6 of the present invention may be produced by:

a first step of mixing a basic catalyst and an organic solvent in a reactor, adding an organic silane compound thereto, and performing condensation to produce the compound of Chemical Formula 10; after the first step, a second step of adding an acidic catalyst to the reactor and adjusting a reaction solution to be acidic in order to introduce a [B]b structure and a [D]d(OR10)2 structure to the compound of Chemical Formula 10, adding an organic silane compound, and stirring the same; after the second step, a third step of adding a basic catalyst to the reactor to convert the reaction solution to be basic and performing a condensation reaction; and after the third step, a fourth step of adding an acidic catalyst to the reactor in order to introduce an [E]eX2 structure to the terminal end of the composite polymer and thus converting the reaction solution into an acidic solution, mixing the resultant with an organic silane compound, and stirring the same.

Specifically, in the method of preparing Chemical Formulae 1 to 6, pH of the reaction solution in the first step of the present invention may be 9 to 11.5, pH of the reaction solution in the second step may be 2 to 4, pH of the reaction solution in the third step may be 8 to 11.5, and pH of the reaction solution in the fourth step to introduce an [E]eX2 may be 1.5 to 4. Within the ranges, a yield of the produced silsesquioxane composite polymer may be high and mechanical properties of the produced silsesquioxane composite polymer may be improved.

The silsesquioxane composite polymer represented by Chemical Formula 7 of the present invention may be produced by:

a first step of mixing a basic catalyst and an organic solvent in a reactor, adding an organic silane compound thereto, and preparing two types of compounds of Chemical Formula 10 by controlling a condensation degree; a second step of adding an acidic catalyst to the reactor and adjusting a reaction solution to be acidic in order to introduce a [B]b structure and a [D]d(OR12)2 structure to the compounds of Chemical Formula 10 obtained in the first step, adding an organic silane compound, and stirring the same; after the reaction of each second step, a third step of adding a basic catalyst to the reactor to convert the reaction solution to be basic and performing a condensation reaction; and a fourth step of performing condensation of the two types of compounds obtained through the third step under a basic condition and linking them.

The silsesquioxane composite polymer represented by Chemical Formula 8 of the present invention may be produced by:

a first step of mixing a basic catalyst and an organic solvent in a reactor, adding an organic silane compound thereto, and preparing two types of compounds of Chemical Formula 10 by controlling a condensation degree; a second step of adding an acidic catalyst to the reactor and adjusting a reaction solution to be acidic in order to introduce a [B]b structure and a [D]d(OR14)2 structure to the compounds of Chemical Formula 10 obtained in the first step, adding an organic silane compound, and stirring the same; after the reaction of each second step, a third step of adding a basic catalyst to the reactor to convert the reaction solution to be basic and to perform a condensation reaction; a fourth step of performing condensation of the two types of compounds obtained through the third step under a basic condition and linking them; after the fourth step, a fifth step of adding an acidic catalyst to the reactor in order to introduce [D]d(OR13)2 to control the reaction solution to be acidic, adding an organic silane compound, and stirring the same; and after the reaction of the fifth step, a sixth step of adding a basic catalyst to the reactor to convert the reaction solution to be basic, and performing a condensation reaction.

The silsesquioxane composite polymer represented by Chemical Formula 9 of the present invention may be produced by:

a first step of mixing a basic catalyst and an organic solvent in a reactor, adding an organic silane compound thereto, and preparing two types of compounds of Chemical Formula 10 by controlling a condensation degree; a second step of adding an acidic catalyst to the reactor and adjusting a reaction solution to be acidic in order to introduce a [B]b structure to the compounds of Chemical Formula 10 obtained in the first step, adding an organic silane compound, and stirring the same; after the reaction of the each second step, a third step of adding a basic catalyst to the reactor to convert the reaction solution to be basic and to perform a condensation reaction; a fourth step of performing condensation of the two types of compounds obtained through the third step under a basic condition and linking them; after the fourth step, a fifth step of adding an acidic catalyst to the reactor in order to introduce [D]dOR52 to control the reaction solution to be acidic, adding an organic silane compound, and stirring the same; after the reaction of the fifth step, a sixth step of adding a basic catalyst to the reactor to convert the reaction solution to be basic, and performing a condensation reaction; and after the sixth step, a seventh step of adding an acidic catalyst to the reactor in order to introduce an [E]eX2 structure to the terminal end of the composite polymer and thus converting the reaction solution into an acidic solution, mixing the resultant with an organic silane compound, and stirring the same.

Specifically, in the method of preparing Chemical Formulae 7 to 9, pH of the reaction solution in the first step may be 9 to 11.5, pH of the reaction solution in the second step may be 2 to 4, pH of the reaction solution in the third step may be 8 to 11.5, pH of the reaction solution in the fourth step may be 9 to 11.5, pH of the reaction solution in the fifth step may be 2 to 4, pH of the reaction solution in the sixth step may be 8 to 11.5, and pH of the reaction solution in the fourth step to introduce an [E]eX2 may be 1.5 to 4. Within the ranges, a yield of the produced silsesquioxane composite polymer may be high and mechanical properties of the produced silsesquioxane composite polymer may be improved.

In addition, as needed, a [B]b repeating unit may be further included in the composite polymer through a step of adding an acidic catalyst to the reactor to control the reaction solution to be acidic and adding an organic silane compound in order to further introduce a [B]b structure and a [D]d (OR)2 structure to each composite polymer, and after the step, a step of adding a basic catalyst to the reactor to convert the reaction solution to be basic and performing a condensation reaction may be included.

In addition, as needed, in order to introduce an [E]eX2 structure to the terminal end of each composite polymer, an acidic catalyst may be added to the reactor, and a reaction solution is converted into an acidic solution, an organic silane compound is mixed therein, and the resultant is stirred so that an [E]e repeating unit is included to the terminal end of the composite polymer.

In the method of producing the silsesquioxane composite polymer, as a basic catalyst, specifically a mixed catalyst of two kinds of basic catalysts, is used, and is neutralized and acidified with an acidic catalyst to induce rehydrolysis, such that a mixed catalyst of two kinds of basic catalysts is used to perform basic condensation, and thereby, in one reactor, acidity and basicity may be continuously controlled.

Herein, the basic catalyst may be produced by appropriately combining two or more kinds of materials selected from a metal-based basic catalyst selected from Li, Na, K, Ca, and Ba, and an amine-based basic catalyst. Specifically, the amine-based basic catalyst may be tetramethyl ammonium hydroxide (TMAH), and the metal-based basic catalyst may be potassium hydroxide (KOH) or sodium bicarbonate (NaHCO$_3$). The content of each component in the mixed catalyst may be optionally controlled such that a ratio of the amine-based basic catalyst and the metal-based basic catalyst may be 10 to 90:90 to 10 parts by weight. Within the ranges, during hydrolysis, reactivity between the functional group and the catalyst may be minimized, and thus defects of organic functional groups such as Si—OH or Si-alkoxy may be remarkably reduced and the condensation degree may be freely adjusted. In addition, the acidic catalyst may be any acidic material that may be generally used in this art, and may be, for example, a general acidic material such as HCl, H$_2$SO$_4$, HNO$_3$, CH$_3$COOH, and the like, or an organic acidic material such as latic acid, tartaric acid, maleic acid, or citric acid.

In the method of producing the silsesquioxane composite polymer of the present invention, the organic solvent may be a generally used organic solvent in the art without limitation, and may be, for example, various solvents such as hexane, cyclohexane, cyclohexanone, toluene, xylene, cresol, chloroform, dichlorobenzene, dimethylbenzene, trimethylbenzene, pyridine, methylnaphthalene, nitromethane, acrylonitrile, methylene chloride, octadecylamine, aniline, dimethyl sulfoxide, or cellosolve, alcohols such as benzyl alcohol, methyl alcohol, ethyl alcohol, isopropyl alcohol, or butyl alcohol, ketones such as lactate, acetone, or methyl(isobutyl) ethylketone, glycols such as ethylene glycol, furans such as tetrahydrofuran, or a polar solvent such as dimethyl formamide, dimethyl acetamide, or N-methyl-2-pyrrolidone.

In addition, the organic silane-based compound may be an organic silane including R, R$^1$, R$^2$, R$^3$, R$^4$, R$^5$, R$^6$, R$^7$, R$^8$, R$^9$, R$^{10}$, R$^{11}$, R$^{12}$, R$^{13}$, R$^{14}$, R$^{15}$, R$^{16}$, R$^{17}$, R$^{18}$, R$^{19}$, R$^{20}$, R$^{21}$, and R$^{22}$ of Chemical Formulae 1 to 9 that is the silsesquioxane composite polymer of the present invention, and specifically an organic silane compound including a phenyl group or an amino group that can improve chemical resistance of the silsesquioxane composite polymer and thus improve non-swelling properties, or an organic silane compound including an epoxy group or a (meth)acryl group that can increase a curing density of the composite polymer and improve mechanical strength and hardness of the cured layer.

Specific examples of the organic silane-based compound may be (3-glysidoxypropyl)trimethoxysilane, (3-glysidoxypropyl)triethoxysilane, (3-glysidoxypropyl)methyldimethoxysilane, (3-glysidoxypropyl)dimethylethoxysilane, 3-(metaacryloxy)propyltrimethoxysilane, 3,4-epoxy butyltrimethoxysilane, 3,4-epoxy butyltriethoxysilane, 2-(3,4-epoxy cyclohexyl)ethyltrimethoxysilane, 2-(3,4-epoxy cyclohexyl)ethyltriethoxysilane, aminopropyltriethoxysilane, vinyltriethoxysilane, vinyltri-t-butoxysilane, vinyltriisobutoxysilane, vinyltriisopropoxysilane, vinyltriphenoxysilane, phenyltriethoxysilane, phenyltrimethoxysilane, aminopropyltrimethoxysilane, N-phenyl-3-aminopropyltrimethoxysilane, dimethyltetramethoxysiloxane, diphenyltetramethoxysiloxane, and the like, which may be used alone or in a mixture of two or more. It is preferable for two or more to be mixed to gain the properties of the finally produced composition.

The silsesquioxane of the present invention may be adjusted to have a condensation degree ranging from 1 to 99.9% to secure excellent storage stability and wide applicability. In other words, an amount of an alkoxy group (OR) linked to Si at the terminal end and in the center may be adjusted in a range of 50% to 0.01% based on that of the entire linking group.

In addition, properties of the substrate including surface hardness may be further improved by controlling a content of the repeating unit [B]b or [E]e.

A weight average molecular weight of the silsesquioxane may be 1000 to 500,000, specifically 1000 to 80,000, and more specifically 2000 to 50,000. Herein, workability and physical characteristics of the silsesquioxane may be simultaneously improved.

The coating layer may improve scratch resistance, water repellent properties, anti-fouling properties, fingerprint resistance, thermal stability, gloss properties, and surface hardness of the substrate, and specifically the coating layer may improve the surface hardness of the substrate from 1H or less to 4H or greater.

A thickness of the coating layer may be 0.1 μm to 500 μm, and more specifically 1 μm to 100 μm. When the coating layer has a thickness of 0.1 μm or greater, surface hardness may be improved, while when the coating layer has a thickness of 500 μm or less, yellowness of the coating layer does not occur and transparency may be maintained.

The laminate of the present invention includes an intermediate interface layer including a Si—O group-containing material between the substrate and the coating layer. The intermediate interface layer is formed by mixing a part of materials constituting a coating layer penetrating the substrate with the substrate, and specifically, may be formed by coating a coating composition once and dry-curing the same to simultaneously form the intermediate interface layer and the coating layer, and more specifically, may be formed by the producing method that will be described later, but is not limited thereto.

The intermediate interface layer according to the present invention includes both the materials constituting a substrate and the materials constituting a coating layer. Specifically, the intermediate interface layer may include both the materials constituting a substrate and Si—O-containing materials constituting a coating layer, more specifically, both the materials constituting a substrate and silsesquioxane, and even more specifically, the materials constituting a substrate and a SiOR functional group.

In the intermediate interface layer, a composition ratio of the materials constituting a substrate and the materials constituting a coating layer may be substrate:coating layer=0-100 wt %:100 wt %-0, and specifically materials constituting a substrate:SiOR=0-100 wt %:100 wt %-0.

The intermediate interface layer may have a continuously-changing composition ratio of the materials constituting a coating layer and the materials constituting a substrate from the coating layer to the substrate. Specifically, from the coating layer to the substrate, the composition ratio of the materials constituting a coating layer may be decreased and the composition ratio of the materials constituting a substrate may be increased.

The intermediate interface layer forms a very strong bond through a physical and chemical bond between a substrate and coating layer-constituting materials, and resultantly, has an effect of improving adherence and bending capability between the substrate and the coating layer. A conventional laminate is easily broken when used for a flexible product, since only surface hardness is improved when a hard coating liquid is coated on a substrate, but as for the laminate according to the present invention, the intermediate interface layer strongly bonds the substrate with a coating layer and has an effect of improving surface hardness and bending capability.

Specifically, the laminate according to the present invention may have adherence of 99 or greater. The adherence is measured by using a universal tensile machine (UTM) after allowing the laminate to stand at 95° C. under humidity of 85% for 240 hours, and when the substrate and the coating layer are completely separated, 0 is given, while when the substrate and the coating layer are not separated, 100 is given, and thus, as the number is larger, the adherence is better.

In addition, the laminate according to the present invention may have bending capability of 15R or less. The bending capability is obtained by measuring a substrate bending radius (R) with a Mandrel tester.

The intermediate interface layer according to the present invention includes both the materials constituting a substrate and the materials constituting a coating layer, and may each have a continuously changing composition ratio. Specifically, as substrate-constituting materials are mixed with coating layer-constituting materials in a continuously changing composition ratio and thus decreases heterogeneity between the substrate and the coating layer, transparency of the intermediate interface layer may be improved.

In addition, the intermediate interface layer may improve scratch resistance, water repellent properties, anti-fouling properties, fingerprint resistance, thermal stability, gloss properties, and surface hardness of the substrate due to the coating layer, and specifically, the intermediate interface layer may provide the laminate according to the present invention having surface hardness of 6H or greater.

A thickness of the intermediate interface layer may be 10 nm to 10,000 nm. When the thickness of the intermediate interface layer is 10 nm or greater, adherence between the substrate and the coating layer may be improved, and when the thickness of the intermediate interface layer is 10,000 nm or less, haze caused by the intermediate interface layer does not occur and high transparency may be obtained.

The intermediate interface layer may have a thickness corresponding to 1/50 to 1/5 of a thickness of the coating layer. When the intermediate interface layer has a thickness corresponding to greater than or equal to 1/50 of that of the coating layer, excellent adherence may be obtained, but when the intermediate interface layer has a thickness corresponding to less than or equal to 1/5 of that of the coating layer, high transparency and excellent bending capability may be maintained.

The laminate according to the present invention simultaneously includes the intermediate interface layer and the coating layer on one surface or both surfaces of the substrate, and thereby transparency, bending capabilities, scratch resistance, water repellent properties, anti-fouling properties, fingerprint resistance, thermal stability, gloss properties, and surface hardness may be improved.

In addition, the present invention provides an article including the laminate, wherein the article has excellent adherence between a coating layer and a substrate, and the coating layer has very high surface hardness and also excellent scratch resistance, water repellent properties, anti-fouling properties, fingerprint resistance, thermal stability, gloss properties, and the like, and thus may be usefully applied to various products such as an optical film, a protective film, a plastic for electronics, spectacles, a building exterior material, a building interior material, a plastic pipe, a wire coating material, an optical lens, soundproof walls, a plastic sign, a plastic sculpture, furniture, lighting, a sunroof, a helmet, and the like, but is not limited thereto.

The silsesquioxane laminate of the present invention may be formed by the producing method including:

(1) coating a Si—O group-containing material on one surface or both surfaces of a substrate; and (2) drying or curing the coated laminate, wherein the intermediate interface layer and the coating layer are simultaneously formed on the substrate through the producing method.

In the present invention, the substrate that is a subject for the coating may be glass or an organic or inorganic plastic as explained in the description of the laminate, and specifically, the plastic may be polycarbonate (PC) or high hardness polycarbonate (high hardness PC).

In addition, the Si—O group-containing material used for coating of the present invention may include a material including silsesquioxane as explained in the description of the laminate, and specifically, a material including SiOR.

In the present invention, the coating composition may further include a) an organic solvent having compatibility with the silsesquioxane, at least one of b) an initiator and c) a hardener, and optionally an additive of a curing accelerator, a plasticizer, an ultraviolet (UV) blocking agent, other functional additives, and the like, and thereby having curing properties, heat resistance characteristics, ultraviolet (UV) blocking effects, plasticizing effects, and the like.

In the coating composition of the present invention, the silsesquioxane may be included in an amount of at least 5 parts by weight, specifically 5 to 90 parts by weight, and more specifically 10 to 50 parts by weight, based on 100 parts by weight of the coating composition. Within the ranges, mechanical properties of a cured film of the coating composition may be further improved.

The organic solvent may be various solvents such as hexane, cyclohexane, cyclohexanone, toluene, xylene, cresol, chloroform, dichlorobenzene, dimethylbenzene, trimethylbenzene, pyridine, methylnaphthalene, nitromethane, acrylonitrile, methylenechloride, octadecylamine, aniline, dimethylsulfoxide, or cellosolve, alcohols such as benzyl alcohol, methyl alcohol, ethyl alcohol, isopropyl alcohol, or butyl alcohol, ketones such as lactate, acetone, or methyl(isobutyl)ethylketone, glycols such as ethylene glycol, furans such as tetrahydrofuran, or a polar solvent such as dimethyl formamide, dimethyl acetamide, or N-methyl-2-pyrrolidone, but is not limited thereto. An amount of the organic solvent may be a balance excluding the composite polymer, the initiator, the hardener, and optional additives.

In the coating composition of the present invention, the initiator or the hardener may be appropriately used according to the organic functional group included in the silsesquioxane composite polymer.

As specific examples, when an organic group capable of post-curing such as an unsaturated hydrocarbon, a thiol, an epoxy group, amine-based group, an isocyanate, and the like is introduced into the organic functional group, various curing methods using heat or light may be available. Herein, changes by heat or light may be caused in the polymer itself, and specifically a curing process may be performed by diluting it in an organic solvent.

In the present invention, for curing and post-reaction of the composite polymer, various initiators may be used, wherein the initiator may be included in an amount of 0.1-20 parts by weight based on a total weight, 100 parts by weight of the composition, and thus transmittance and coating stability after curing may be simultaneously satisfied.

In detail, when the unsaturated hydrocarbon is introduced into the organic functional group, a radical initiator may be used, wherein the radical initiator may be a photo-radical initiator such as trichloro acetophenone, diethoxy acetophenone, 1-phenyl-2-hydroxyl-2-methyl propane-1-one, 1-hydroxycyclohexylphenylketone, 2-methyl-1-(4-methyl thiophenyl)-2-morpholinopropane-1-one, 2,4,6-trimethyl benzoyl diphenylphosphine oxide, camphor quinine, 2,2'-azobis (2-methylbutyronitrile), dimethyl-2,2'-azobis (2-methyl butyrate), 3,3-dimethyl-4-methoxy-benzophenone, p-methoxybenzophenone, 2,2-diethoxy acetophenone, 2,2-dimethoxy-1,2-diphenyl ethan-1-one, and the like, a thermal radical initiator such as t-butylperoxy maleic acid, t-butylhydroperoxide, 2,4-dichlorobenzoylperoxide, 1,1-di(t-butylperoxy)-3,3,5-trimethylcyclohexane, N-butyl-4,4'-di(t-butylperoxy)valerate, and the like, and various mixtures thereof.

In addition, when the organic functional group includes an epoxy group, the photopolymerization initiator (cation) may be a combination of a sulfonium such as triphenylsulfonium, diphenyl-4-(phenylthio)phenylsulfonium, and the like, an iodonium such as diphenyliodonium, bis(dodecylphenyl) iodonium, and the like, a diazonium such as phenyldiazonium, and the like, an ammonium such as 1-benzyl-2-cyanopyridinium, 1-(naphthylmethyl)-2-cyanopyridinium, and the like, iodonium (4-methylphenyl)[4-(2-methylpropyl)phenyl]-hexafluorophosphate, iodonium bis(4-t-butylphenyl)hexafluorophosphate, iodonium diphenylhexafluorophosphate, iodonium diphenyltrifluoromethanesulfonate, triphenylsulfonium tetrafluoroborate, tri-p-tolylsulfonium hexafluorophosphate, tri-p-tolylsulfonium trifluoromethanesulfonate, Fe cations such as (2,4-cyclopentadien-1-yl)[(1-methylethyl)benzene]-Fe, and the like, and a [$BQ_4$]-onium salt of $BF_4^-$, $PF_6^-$, $SbF_6^-$, and the like (wherein Q is a phenyl group substituted with at least two fluorines or trifluoromethyl groups).

In addition, a cation initiator that functions by heat may be a cation-based or protonic acid catalyst such as triflate, a trifluoro boron ether complex compound, trifluoro boron, and the like, various onium salts such as an ammonium salt, a phosphonium salt, and a sulfonium salt, methyltriphenylphosphonium bromide, ethyltriphenylphosphonium bromide, or phenyltriphenylphosphonium bromide, without limitation, and these initiators may be added in mixtures thereof or may be mixed with various radical initiators described above.

In addition, according to the organic functional group, amine hardeners such as ethylenediamine, triethylene tetramine, tetraethylene pentamine, 1,3-diaminopropane, dipropylenetriamine, 3-(2-aminoethyl)amino-propylamine, N,N'-bis(3-aminopropyl)-ethylenediamine, 4,9-dioxadodecane-1,12-diamine, 4,7,10-trioxatridecane-1,13-diamine, hexamethylenediamine, 2-methylpentamethylenediamine, 1,3-bisaminomethylcyclohexane, bis(4-aminocyclohexyl) methane, norborenediamine, 1,2-diaminocyclohexane, and the like may be used.

An acid anhydride hardener such as phthalic anhydride, trimellitic anhydride, pyrotrimellitic anhydride, maleic anhydride, tetrahydro phthalic anhydride, methylhexahydro phthalic anhydride, methyltetrahydro phthalic anhydride, methyl nadic anhydride, hydrogen methyl nadic anhydride, trialkyltetrahydro phthalic anhydride, dodecenyl succinic anhydride, 2,4-diethylglutaric anhydride, and the like may be used.

The hardener may be included in an amount of 0.1-20 parts by weight based on 100 parts by weight of the composition.

In addition, the curing accelerator to promote curing may be a triazine-based compound such as acetoguanamine, benzoguanamine, 2,4-diamino-6-vinyl-s-triazine, and the like, an imidazole-based compound such as imidazole, 2-methylimidazole, 2-ethyl-4-methylimidazole, 2-phenylimidazole, 2-phenyl-4-methylimidazole, vinylimidazole, 1-methylimidazole, and the like, 1,5-diazabicyclo[4.3.0] nonene-5,1,8-diazabicyclo[5.4.0]undecene-7, triphenylphosphine, diphenyl(p-tryl)phosphine, tris(alkylphenyl) phosphine, tris(alkoxyphenyl)phosphine, ethyltriphenylphosphonium phosphate, tetrabutylphosphonium hydroxide, tetrabutylphosphonium acetate, tetrabutylphosphonium hydrogen difluoride, tetrabutylphosphonium dihydrogen trifluorine, and the like.

In the present invention, in order to improve hardness, strength, durability, formability, and the like through a curing process or a post-reaction, an additive such as an ultraviolet (UV) absorber, an antioxidant, an antifoaming agent, a leveling agent, a water repellent, a flame retardant, an adhesion improving agent, and the like may be additionally included. Such an additive is not particularly limited and may be appropriately added within a range in which characteristics of a substrate, that is, flexibility, light transmittance, heat resistance, hardness, strength, and the like, are not damaged. The additive may be independently added in an amount of 0.01-10 parts by weight based on 100 parts by weight of the composition.

Usable additives in the present invention may be polyether-modified polydimethylsiloxane, (for example, BYK-300, BYK-301, BYK-302, BYK-331, BYK-335, BYK-306, BYK-330, BYK-341, BYK-344, BYK-307, BYK-333, BYK-310, etc. of BYK), polyether modified hydroxyfunctional poly-dimethyl-siloxane, (for example, BYK-308, BYK-373, etc. of BYK), methylalkylpolysiloxane, for example, BYK-077, BYK-085, etc.), polyether modified methylalkylpolysiloxane, (for example, BYK-320, BYK-325, etc.), polyester modified poly-methyl-alkyl-siloxane (for example, BYK-315, etc.), aralkyl modified methylalkyl polysiloxane (for example, BYK-322, BYK-323, etc.), polyester modified hydroxy functional polydimethylsiloxane (for example, BYK-370, etc.), acrylic functional polyester modified polydimethylsiloxane (for example, BYK-371, BYK-UV 3570, etc.), polyether-polyester modified hydroxy functional polydimethylsiloxane (for example, BYK-375, etc.), polyether modified dimethylpolysiloxane (for example, BYK-345, BYK-348, BYK-346, BYK-UV3510, BYK-332, BYK-337, etc.), a non-ionic acrylic copolymer (for example, BYK-380, etc.), an ionic acrylic copolymer (for example, BYK-381, etc.), polyacrylate (for example, BYK-353, BYK-356, BYK-354, BYK-355, BYK-359, BYK-361 N, BYK-357, BYK-358 N, BYK-352, etc.), polymethacrylate (for example, BYK-390, etc.), polyether modified acryl functional polydimethylsiloxane (for example, BYK-UV 3500, BYK-UV3530, etc.), polyether modified siloxane (for example, BYK-347, etc.), alcohol alkoxylates (for example, BYK-DYNWET 800, etc.), acrylate (for example, BYK-392, etc.), silicone hyrodxy modified polyacrylate (OH-functional) (for example, BYK-Silclean 3700, etc.), and the like.

In the present invention, the coating composition may be coated on the surface of the substrate by known methods of spin coating, bar coating, slit coating, dip coating, natural coating, a reverse coating, roll coating, spin coating, curtain coating, spray coating, dipping, an impregnation method, and gravure coating that may be arbitrarily applied by a person of ordinary skill in the art.

The present invention includes drying or curing the coated laminate.

The drying may be performed at 50 to 100° C. for 1 to 20 minutes. Then through a photocuring step, the intermediate interface layer may be stably produced and adhesion between the substrate and the coating layer may be further improved.

The curing may be photocuring, and the photocuring may be ultraviolet (UV) curing, specifically using a UV lamp at 200 mJ to 2000 mJ. Accordingly, the intermediate interface layer may be stably produced and adhesion between the substrate and the coating layer may be further improved.

The producing method of the present invention may further include an aging step of the photocured substrate.

The aging step may be performed at 50 to 100° C. for 3 to 48 hours. Through the aging step, the intermediate interface layer may be stably produced and adhesion between the substrate and the coating layer may be further improved, while the surface of the coating layer may have excellent surface hardness, transparency, scratch resistance, water repellent properties, anti-fouling properties, fingerprint resistance, thermal stability, and gloss properties.

Hereinafter, preferable examples are described in order to help understanding of the present invention, but the following examples are only illustrative of the present invention, and do not limit the disclosure of the present invention in any way. In the examples of the present invention, ECHETMS indicates 2-(3,4-epoxycyclohexyl)ethyltrimethoxysilane, GPTMS indicates glycidoxypropyt-rimethoxysilane, MAPTMS indicates (methacryloyloxy) propyltrimethoxysi lane, PTMS indicates phenyltrimethoxysilane, MTMS indicates methyltrimethoxysilane, ECHET-MDS indicates di(epoxycyclohexyethyl) tetramethoxy disiloxane, GPTMDS indicates di(glycidoxypropyl) tetramethoxy disiloxane, MAPTMDS indicates di(methacryloyloxy)propy, PTMDS indicates di(phenyl) tetramethoxy disiloxane, and MTMDS indicates di(methyl) tetramethoxy disiloxane.

Example 1: Synthesis of Silsesquioxane A-D Structure Composite Polymer

Synthesis steps of continuous hydrolysis and condensation were performed by stages as follows.

[Example 1-a] Preparation of Catalyst

In order to control basicity, a 25 wt % tetramethylammonium hydroxide (TMAH) aqueous solution was mixed with a 10 wt % potassium hydroxide (KOH) aqueous solution to produce Catalyst 1a.

[Example 1-b] Synthesis of Linear Silsesquioxane Structure 5 parts by weight of distilled water, 15 parts by weight of tetrahydrofuran, and 1 part by weight of the catalyst produced in Example 1-a were added in a dropwise fashion to a dried flask mounted with a condensing tube and an agitator and stirred for 1 hour at room temperature, 20 parts by weight of 2-(3,4-epoxycyclohexyl)ethyltrimethoxysilane was added in a dropwise fashion, and 15 parts by weight of tetrahydrofuran was added in a dropwise fashion, and further stirred for 5 hours. The mixed solution during the stirring was taken out and washed twice to remove the catalyst and impurities, and then filtered, and it was confirmed that a Si—OH functional group was produced at the terminal end through IR analysis (3200 cm$^{-1}$), and the silsesquioxane having a linear structure such as Chemical Formula 4 was found to have a styrene-reduced molecular weight of 8000 by measuring the molecular weight.

[Example 1-c] Production of Continuous Cage Structure 5 parts by weight of a 0.36 wt % HCl aqueous solution was very slowly added in a dropwise fashion to the mixed solution of Example 1-b to adjust pH to acidic, and the obtained mixture was stirred for 30 minutes at 4° C. Subsequently, 5 parts by weight of diphenyltetramethoxydisiloxane was added thereto in a dropwise fashion to secure stable hydrolysis, and after stirring the obtained mixture for 1 hour, 7 parts by weight of the catalyst of Example 1-a was added thereto to adjust pH of the mixed solution to basic. Herein, a precursor having a D structure with an open alkoxy was formed, apart from a linear polymer. A small amount of a sample was taken and analyzed with H-NMR and IR to examine a residual rate of methoxy, and when the residual rate was 20%, 10 parts by weight of a 0.36 wt % HCl aqueous solution was slowly added thereto in a dropwise fashion to adjust pH to acidic. Then, 1 part by weight of phenyltrimethoxysilane was added at one time thereto in a dropwise fashion and stirred therewith for 15 minutes, and 20 parts by weight of the catalyst of Example 1-a was added thereto. After stirring the obtained mixture for 4 hours, a cage-shaped polymer was formed. Then, the mixed solution was cooled to room temperature, and tetrahydrofuran in the mixed solution was removed under vacuum to convert the entire reactant into an aqueous solution mixture. After stirring the aqueous solution mixture for 4 hours, a $^{29}$Si-NMR analysis result of a part taken therefrom and analyzed showed two sharp peaks of a structure introduced by using a phenyl group, and accordingly, greater than or equal to 50% of an A-D polymer represented by Chemical Formula 1 turned out to be produced without a separately-remaining byproduct. In addition, a styrene-reduced molecular weight was 11,000, and n was 4-6. $^{29}$Si-NMR (CDCl$_3$) δ

[Example 1-d] Preparation of Coating Composition 20 g of the silsesquioxane composite polymer according to Example 1-c, 80 g of ethanol, 0.5 g of a photocurable Irgure initiator, and 0.05 g of a siloxane additive made by BYK were uniformly mixed to prepare a coating composition.

[Example 1-e] Coating

The coating composition according to Example 1-d was coated to be 30 um thick on a PC substrate (Glastic 0.5T, I-components Co., Ltd.), thermally dried at 90° C., photocured with 500 mJ by using a UV lamp, and aged at 90° C. for 20 hours. The coated PC substrate had an intermediate interface layer that was clearly distinguished between the polycarbonate substrate and the coating layer despite coating once.

In addition, a silsesquioxane composite polymer and a coating composition were prepared by using monomers shown in Table 19. Herein, the method used in Examples 1-b, 1-c, 1-d, and 1-e was equally used as a preparing method.

TABLE 19

| Example method No. | Monomer 1-b method is applied | Monomer 1-c method is applied | | Molecular weight (Mw) |
|---|---|---|---|---|
| | | Precursor | Cage introduction | |
| 1 | ECHETMS | PTMDS | PTMS | 11,000 |
| 1-1 | PTMS | PTMDS | PTMS | 8000 |
| 1-2 | MTMS | MTMDS | MTMS | 48,000 |
| 1-3 | GPTMS | GPTMDS | GPTMS | 25,000 |
| 1-4 | MAPTMS | MAPTMDS | MAPTMS | 21,000 |
| 1-5 | ECHETMS | ECHETMDS | ECHETMS | 3000 |
| 1-6 | ECHETMS | MTMDS | MTMS | 9000 |
| 1-7 | ECHETMS | GPTMDS | GPTMS | 11,000 |
| 1-8 | ECHETMS | MAPTMDS | MAPTMS | 18,000 |
| 1-9 | PTMS | ECHETMDS | ECHETMS | 36,000 |
| 1-10 | PTMS | MTMDS | MTMS | 120,000 |
| 1-11 | PTMS | GPTMDS | GPTMS | 11,000 |
| 1-12 | PTMS | MAPTMDS | MAPTMS | 110,000 |
| 1-13 | MTMS | ECHETMDS | ECHETMS | 18,000 |
| 1-14 | MTMS | PTMDS | PTMS | 5000 |
| 1-15 | MTMS | GPTMDS | GPTMS | 80,000 |
| 1-16 | MTMS | MAPTMDS | MAPTMS | 35,000 |
| 1-17 | GPTMS | ECHETMDS | ECHETMS | 7000 |
| 1-18 | GPTMS | PTMDS | PTMS | 120,000 |
| 1-19 | GPTMS | MTMDS | MTMS | 100,000 |
| 1-20 | GPTMS | MAPTMDS | MAPTMS | 4,000 |
| 1-21 | MAPTMS | ECHETMDS | ECHETMS | 35,000 |
| 1-22 | MAPTMS | PTMDS | PTMS | 2800 |
| 1-23 | MAPTMS | MTMDS | MTMS | 8000 |
| 1-24 | MAPTMS | GPTMDS | GPTMS | 180,000 |

Example 2: Synthesis of Silsesquioxane D-A-D Structure Composite Polymer

A D-A-D structure composite polymer was prepared by using the following examples, and a coating composition was produced according to a method as described in Example 1. As for a catalyst and a linear structure, the same method as used in Examples 1-a and 1-b was used, and then a continuous D-A-D structure was produced as follows.

[Example 2-a] Producing Excessive Continuous Cage Structure 5 parts by weight of a 0.36 wt % HCl aqueous solution was very slowly added in a dropwise fashion to the mixed solution of Example 1-b to adjust pH to acidic, and the mixture was stirred at 4° C. for 30 minutes. Subsequently, 25 parts by weight of diphenyltetramethoxydisiloxane, which was 5 times as much as used in Example 1-b, were added at one time thereto in a dropwise fashion to secure stable hydrolysis, the obtained mixture was stirred for 1 hour, and 7 parts by weight of the catalyst according to Example 1-a was added thereto to adjust pH of the mixed solution to basic. Herein, a precursor having a D structure with an open alkoxy was formed, apart from the linear polymer. A small amount of a sample was taken and analyzed through H-NMR and IR to examine a residual rate of methoxy, and when the residual rate was 20%, 10 parts by weight of a 0.36 wt % HCl aqueous solution was slowly added thereto in a dropwise fashion to adjust pH to acidic. Subsequently, 1 part by weight of phenyltrimethoxysilane was added at one time thereto in a dropwise fashion, the mixture was stirred for 15 minutes, and 20 parts by weight of a catalyst of Example 1-a was added thereto. After stirring the obtained mixture for 4 hours, a cage-shaped polymer was produced. Subsequently, the temperature was decreased to room temperature, and tetrahydrofuran in the mixed solution was removed under vacuum to convert the entire reactant into an aqueous solution mixture. After stirring the mixture for 4 hours, a $^{29}$Si-NMR analysis result of a part showed two sharp peaks of a structure introduced by using a phenyl group, and accordingly, an A-D polymer represented by Chemical Formula 1 turned out to be produced without a separately remaining byproduct. In addition, a styrene-reduced molecular weight was 14,000, and n was 4-6. Further, in the Si-NMR analysis, a peak of around −68 ppm showing at the terminal end A disappeared, unlike the A-D structure, and accordingly, the terminal end of the structure A was converted into a structure D and thus produced a D-A-D structure. $^{29}$Si-NMR (CDCl$_3$) δ −72.3 (broad), −81.1 (sharp), −80.8 (sharp), −82.5 (broad)

In addition, monomers shown in Table 20 were applied to prepare a silsesquioxane composite polymer and a coating composition. Herein, the method used in Example 2 was equally applied as a producing method.

TABLE 20

| Example method No. | Monomer 1-b method is applied | Monomer 2-a method is applied | | Molecular weight (Mw) |
|---|---|---|---|---|
| | | Precursor | Cage introduction | |
| 2 | ECHETMS | PTMDS | PTMS | 14,000 |
| 2-1 | PTMS | PTMDS | PTMS | 9000 |
| 2-2 | MTMS | MTMDS | MTMS | 52,000 |
| 2-3 | GPTMS | GPTMDS | GPTMS | 30,000 |
| 2-4 | MAPTMS | MAPTMDS | MAPTMS | 24,000 |
| 2-5 | ECHETMS | ECHETMDS | ECHETMS | 6000 |
| 2-6 | ECHETMS | MTMDS | MTMS | 12,000 |
| 2-7 | ECHETMS | GPTMDS | GPTMS | 13,000 |
| 2-8 | ECHETMS | MAPTMDS | MAPTMS | 21,000 |
| 2-9 | PTMS | ECHETMDS | ECHETMS | 38,000 |
| 2-10 | PTMS | MTMDS | MTMS | 150,000 |
| 2-11 | PTMS | GPTMDS | GPTMS | 18,000 |

TABLE 20-continued

| Example method No. | Monomer 1-b method is applied | Monomer 2-a method is applied | | Molecular weight (Mw) |
|---|---|---|---|---|
| | | Precursor | Cage introduction | |
| 2-12 | PTMS | MAPTMDS | MAPTMS | 123,000 |
| 2-13 | MTMS | ECHETMDS | ECHETMS | 23,000 |
| 2-14 | MTMS | PTMDS | PTMS | 9000 |
| 2-15 | MTMS | GPTMDS | GPTMS | 91,000 |
| 2-16 | MTMS | MAPTMDS | MAPTMS | 41,000 |
| 2-17 | GPTMS | ECHETMDS | ECHETMS | 12,000 |
| 2-18 | GPTMS | PTMDS | PTMS | 131,000 |
| 2-19 | GPTMS | MTMDS | MTMS | 110,000 |
| 2-20 | GPTMS | MAPTMDS | MAPTMS | 6000 |
| 2-21 | MAPTMS | ECHETMDS | ECHETMS | 38,000 |
| 2-22 | MAPTMS | PTMDS | PTMS | 5000 |
| 2-23 | MAPTMS | MTMDS | MTMS | 12,000 |
| 2-24 | MAPTMS | GPTMDS | GPTMS | 192,000 |

A coating composition was prepared by using the polymer of Example 1-d except for using the silsesquioxane composite polymer prepared in Example 2, and then coated on a PC substrate and cured like Example 1-e. The coated PC substrate had an intermediate interface layer that was clearly distinguished between the polycarbonate substrate and the coating layer despite coating once.

Example 3: Synthesis of Silsesquioxane E-A-D Structure Composite Polymer

In order to produce the E-A-D structure composite polymer, the following examples were used, and a coating composition was produced according to the same method as in Example 1. As for a catalyst and a linear structure, the same method as in Example 1 was used, and then an E-A-D structure was produced as follows.

[Example 3-a] Production of Chain Terminal End E Structure 20 parts by weight of methylene chloride was added to the A-D mixture of Example 1-c in a dropwise fashion without separate purification, 5 parts by weight of a 0.36 wt % HCl aqueous solution was added thereto in a dropwise fashion to adjust pH to acidic, and the mixture was stirred at 4° C. for 30 minutes. Then, 1 part by weight of dimethyltetramethoxysilane was added at one time thereto in a dropwise fashion. Herein, moieties not hydrolyzed in a molecular structure were easily converted into a hydrolyzed product in an acid aqueous solution layer separated from a solvent and condensed with a separately-produced reactant in an organic solvent layer to introduce E into a terminal end unit. After stirring the reactant for 5 hours, the stirring for a reaction was stopped, and a reactor was cooled to room temperature.

[Example 3-b] Introduction of Cage into Terminal End E Structure

An organic layer of the resulting material of Example 3-a was prepared without particular purification, and a trifunctional monomer was used to convert its terminal end into a cage structure. Three parts by weight of methyltrimethoxysilane was added at one time in a dropwise fashion to the mixed solution of Example 3-a to secure stable hydrolysis, and after stirring for 24 hours, 3 parts by weight of the catalyst of Example 1-a was added thereto to adjust pH of the mixed solution to basic. Herein, a cage-shaped polymer was introduced into a terminal end of the E structure, and thus a polymer represented by Chemical Formula 3 was formed through a continuous reaction in a reactor. However, the polymer was obtained with other byproducts and thus needed separate purification. Subsequently, the temperature was changed to room temperature, and tetrahydrofuran in the mixed solution was removed under vacuum and prepared for purification.

[Example 3-c] Removal of Byproducts Through Precipitation and Recrystallization and Obtaining Resulting Material When the reaction was complete in Example 3-b, the mixture was washed with distilled water, and when a distilled water layer showed neutral pH, a solvent was completely removed through vacuum decompression. Subsequently, precipitation was performed twice in methanol to remove an unreacted monomer, 30 parts by weight of a precipitate therefrom was dissolved in a solvent of tetrahydrofuran and an aqueous solution in a weight ratio of 9.5:0.5, and the solution was stored at −20° C. for 2 days. This was to recrystallize a material not introduced into a polymer but closed into a cage structure and thus facilitate purification.

A solid material after the recrystallization was filtered to obtain a polymer represented by Chemical Formula 3 with various byproducts through vacuum decompression. In addition, comparing GPC results with NMR results, a polymer was obtained as a sharp cage shape without a low molecular weight in each polymer growth step, and accordingly, a composite polymer turned out to be easily obtained. Herein, a styrene-reduced molecular weight was 17,000, and n was 4-6, and particularly, a result of Chemical Formula 3 is as follows.

$^{29}$Si-NMR (CDCl$_3$) δ −68.2, −71.8 (sharp). −72.3 (broad), −81.1 (sharp), −80.8 (sharp), −82.5 (broad)

In addition, monomers shown in Table 21 were used to prepare a silsesquioxane composite polymer and a coating composition. Herein, the method used in Example 3 was equally used as a producing method.

TABLE 21

| Example method No. | Monomer 1-b method is applied | Monomer 1-c method is applied | | Monomer 3-a method is applied | Monomer 3-b method is applied | Mw |
|---|---|---|---|---|---|---|
| | | Precursor | Cage introduction | | | |
| 3 | ECHETMS | PTMDS | PTMS | MTMDS | MAPTMS | 17,000 |
| 3-1 | ECHETMS | ECHETMDS | ECHETMS | ECHETMDS | ECHETMS | 12,000 |
| 3-2 | PTMS | PTMDS | PTMS | PTMDS | PTMS | 18,000 |
| 3-3 | MTMS | MTMDS | MTMS | MTMDS | MTMS | 59,000 |
| 3-4 | GPTMS | ECHETMDS | ECHETMS | GPTMDS | GPTMS | 41,000 |
| 3-5 | MAPTMS | MAPTMDS | MAPTMS | MAPTMDS | MAPTMS | 31,000 |

TABLE 21-continued

| Example method No. | Monomer 1-b method is applied | Monomer 1-c method is applied — Precursor | Monomer 1-c method is applied — Cage introduction | Monomer 3-a method is applied | Monomer 3-b method is applied | Mw |
|---|---|---|---|---|---|---|
| 3-6 | ECHETMS | ECHETMDS | ECHETMS | PTMDS | PTMS | 16,000 |
| 3-7 | ECHETMS | ECHETMDS | ECHETMS | MTMDS | MTMS | 12,000 |
| 3-8 | ECHETMS | ECHETMDS | ECHETMS | GPTMDS | GPTMS | 16,000 |
| 3-9 | ECHETMS | ECHETMDS | ECHETMS | MAPTMDS | MAPTMS | 92,000 |
| 3-10 | ECHETMS | PTMDS | PTMS | ECHETMDS | ECHETMS | 25,000 |
| 3-11 | ECHETMS | MTMDS | MTMS | ECHETMDS | ECHETMS | 38,000 |
| 3-12 | ECHETMS | GPTMDS | GPTMS | ECHETMDS | ECHETMS | 56,000 |
| 3-13 | ECHETMS | MAPTMDS | MAPTMS | ECHETMDS | ECHETMS | 97,000 |
| 3-14 | PTMS | PTMDS | PTMS | ECHETMDS | ECHETMS | 24,000 |
| 3-15 | PTMS | PTMDS | PTMS | MTMDS | MTMS | 31,000 |
| 3-16 | PTMS | PTMDS | PTMS | ECHETMDS | ECHETMS | 21,000 |
| 3-17 | PTMS | PTMDS | PTMS | MAPTMDS | MAPTMS | 64,000 |
| 3-18 | PTMS | ECHETMDS | ECHETMS | PTMDS | PTMS | 120,000 |
| 3-19 | PTMS | MTMDS | MTMS | PTMDS | PTMS | 210,000 |
| 3-20 | PTMS | GPTMDS | GPTMS | PTMDS | PTMS | 23,000 |
| 3-21 | PTMS | MAPTMDS | MAPTMS | PTMDS | PTMS | 160,000 |
| 3-22 | MTMS | MTMDS | MTMS | ECHETMDS | ECHETMS | 63,000 |
| 3-23 | MTMS | MTMDS | MTMS | PTMDS | PTMS | 52,000 |
| 3-24 | MTMS | MTMDS | MTMS | GPTMDS | GPTMS | 73,000 |
| 3-25 | MTMS | MTMDS | MTMS | MAPTMDS | MAPTMS | 98,000 |
| 3-26 | MTMS | ECHETMDS | ECHETMS | MTMDS | MTMS | 41,000 |
| 3-27 | MTMS | PTMDS | PTMS | MTMDS | MTMS | 15,000 |
| 3-28 | MTMS | GPTMDS | GPTMS | MTMDS | MTMS | 110,000 |
| 3-29 | MTMS | MAPTMDS | MAPTMS | MTMDS | MTMS | 45,000 |
| 3-30 | GPTMS | GPTMDS | GPTMS | ECHETMDS | ECHETMS | 35,000 |
| 3-31 | GPTMS | GPTMDS | GPTMS | PTMDS | PTMS | 33,000 |
| 3-32 | GPTMS | GPTMDS | GPTMS | MTMDS | MTMS | 48,000 |
| 3-33 | GPTMS | GPTMDS | GPTMS | MAPTMDS | MAPTMS | 29,000 |
| 3-34 | GPTMS | ECHETMDS | ECHETMS | GPTMDS | GPTMS | 19,000 |
| 3-35 | GPTMS | PTMDS | PTMS | GPTMDS | GPTMS | 156,000 |
| 3-36 | GPTMS | MTMDS | MTMS | GPTMDS | GPTMS | 116,000 |
| 3-37 | GPTMS | MAPTMDS | MAPTMS | GPTMDS | GPTMS | 12,000 |
| 3-38 | MAPTMS | MAPTMDS | MAPTMS | ECHETMDS | ECHETMS | 31,000 |
| 3-39 | MAPTMS | MAPTMDS | MAPTMS | PTMDS | PTMS | 28,000 |
| 3-40 | MAPTMS | MAPTMDS | MAPTMS | MTMDS | MTMS | 35,000 |
| 3-41 | MAPTMS | MAPTMDS | MAPTMS | GPTMDS | GPTMS | 31,000 |
| 3-42 | MAPTMS | ECHETMDS | ECHETMS | MAPTMDS | MAPTMS | 57,000 |
| 3-43 | MAPTMS | PTMDS | PTMS | MAPTMDS | MAPTMS | 9,000 |
| 3-44 | MAPTMS | MTMDS | MTMS | MAPTMDS | MAPTMS | 19,000 |
| 3-45 | MAPTMS | GPTMDS | GPTMS | MAPTMDS | MAPTMS | 213,000 |

A coating composition was prepared by using the polymer of Example 1-d except for using the silsesquioxane composite polymer according to Example 3, and was then coated on a PC substrate and cured in the same method as in Example 1-e. The coated PC substrate had an intermediate interface layer between the polycarbonate substrate and the coating layer despite coating once.

Example 4: Synthesis of A-B-D Structure Composite Silsesquioxane Polymer

Synthesis steps of continuous hydrolysis and condensation were performed by stages as follows to produce a composite polymer of an A-B-D structure, and a coating composition was produced according to the same method as in Example 1.

[Example 4-a] Preparation of Catalyst for Preparing Hydrolysis and Condensation Reaction In order to control basicity, a 25 wt % tetramethylammonium hydroxide (TMAH) aqueous solution was mixed with a 10 wt % potassium hydroxide (KOH) aqueous solution to produce Catalyst 1a.

[Example 4-b] Synthesis of Linear Silsesquioxane Structure (Synthesis of A-B Precursor)

5 parts by weight of distilled water, 40 parts by weight of tetrahydrofuran, and 0.5 parts by weight of the catalyst produced in Example 4-a were added in a dropwise fashion to a dried flask mounted with a condensing tube and an agitator and stirred for 1 hour at room temperature, 10 parts by weight of 2-(3,4-epoxycyclohexyl)ethyltrimethoxysilane were added in a dropwise fashion, and 20 parts by weight of tetrahydrofuran were added in a dropwise fashion, and the mixture was further stirred for 2 hours. The mixed solution during the stirring was taken out and washed twice to filter and remove the catalyst and impurities to obtain linear silsesquioxane in which less than or equal to 0.1 mmol/g of an alkoxy group remained, which was confirmed through $^1$H-NMR analysis, and used to introduce a cage therein through a continuous reaction. The linear silsesquioxane turned out to have an overall linear structure through an XRD analysis. The silsesquioxane having a linear structure turned out to have a styrene-reduced molecular weight of 6000.

$^1$H-NMR (CDCl$_3$) δ 3.7, 3.4, 3.3 (broad), 3.1, 2.8, 2.6, 1.5 (broad), 0.6.

[Example 4-c] PH Conversion Reaction for
Producing Cage Structure within Chain
(Introduction of B,D Structure)

5 parts by weight of a 0.36 wt % HCl aqueous solution was very slowly added in a dropwise fashion to the mixed solution of Example 4-b under a reaction, and the mixture was adjusted to have acidic pH and stirred at 4° C. for 30 minutes. Subsequently, 5 parts by weight of diphenyltetramethoxydisiloxane was added at one time thereto in a dropwise fashion, the obtained mixture was stirred for one hour, and 5 parts by weight of the catalyst of Example 4-a was added thereto to adjust pH of the mixed solution to basic. Herein, a cage-shaped structure apart from the linear structure was produced and introduced into a polymer chain, and then the temperature was changed to room temperature, and tetrahydrofuran in the mixed solution was removed under vacuum to convert the overall reactant into an aqueous solution mixture. After stirring for 4 hours, a part was taken therefrom and analyzed through $^{29}$Si-NMR and $^1$H-NMR, and as a result, an amount of an alkoxy group in the B structure was changed to 0.025 mmol/g, which shows that repeating units B and D were introduced in a ratio of about 5:5. In addition, a styrene-reduced molecular weight was 10,000. Furthermore, even though a cage-shaped structure was introduced, a molecular weight distribution of a single cage-type material was not found in a GPC shape of the polymer, and accordingly the cage structure turned out to be introduced into a polymer chain through a continuous reaction.

$^1$H-NMR (CDCl$_3$) δ 7.5, 7.2, 3.7, 3.4, 3.3 (broad), 3.1, 2.8, 2.6, 1.5 (broad), 0.6. $^{29}$Si-NMR (CDCl$_3$) δ −72.5 (broad), −81.1 (sharp), −80.8 (sharp), −79.9 (sharp), −82.5 (broad)

[Example 4-d] Introduction of X into B Structure
(Introduction of B,D Structure)

An organic layer of the resulting material of Example 4-c was prepared through separate purification, and then a trifunctional monomer was used to convert its terminal end into a cage structure. 100 parts by weight of the material of Example 4-c was dissolved in 50 parts by weight of tetrahydrofuran, and 5 parts by weight of distilled water was added thereto to prepare a mixed solution. Then, 10 parts by weight of 0.36 wt % HCl was added to the mixed solution, the obtained mixture was stirred for 10 minutes, and 3 parts by weight of methyltrimethoxysilane was added at one time thereto in a dropwise fashion to secure stable hydrolysis. After stirring the obtained mixture for 24 hours, 3 parts by weight of the catalyst of Example 4-a was added again thereto to adjust pH of the mixed solution to basic. Herein, a cage-shaped polymer was introduced into X of a B structure, and a polymer represented by Chemical Formula 4 was formed through a continuous reaction in a reactor. However, the polymer was obtained with other byproducts and needed separate purification. Subsequently, the temperature was changed to room temperature, and tetrahydrofuran in the mixed solution was removed under vacuum and prepared for the purification.

[Example 4-e] Removal of Byproducts Through
Precipitation and Recrystallization and Obtaining
Resulting Material 200 parts by weight of methylene chloride was added to the mixture of Example 4-d after completion of the reaction and used to perform separate washing along with distilled water, and when a distilled water layer showed neutral pH, a solvent was completely removed through vacuum decompression. Subsequently, the resultant was precipitated twice in methanol, 30 parts by weight of a precipitate obtained after removing an unreacted monomer was dissolved in a mixed solvent of tetrahydrofuran and an aqueous solution in a weight ratio of 9.5:0.5, and the solution was stored at −20° C. for 2 days. This was to recrystallize a material not introduced in a polymer and closed to have a cage structure and facilitate purification.

After the recrystallization, the obtained solid materials were filtered and vacuum-decompressed to obtain a polymer represented by Chemical Formula 4 without other byproducts. In addition, comparing GPC results with NMR results, a sharp cage shape without a low molecular weight was obtained alone in each polymer growth step, and thus a composite polymer was obtained without a problem. Herein, a styrene-reduced molecular weight was 12,000, n of X was 4-6, n of Y was 4-6, and particularly, a result of Chemical Formula 4 is as follows.

$^{29}$Si-NMR (CDCl$_3$) δ −72.5 (broad), −81.1 (sharp), −80.8 (sharp), −79.9 (sharp), −81.5 (sharp), −82.5 (broad)

In addition, monomers shown in Table 22 were applied to prepare a silsesquioxane composite polymer and a coating composition. Herein, the method used in Example 4 was equally applied as a producing method.

TABLE 22

| Example method No. | Monomer 4-b method is applied | Monomer 4-c method is applied | Monomer 4-d method is applied | Molecular weight (Mw) |
| --- | --- | --- | --- | --- |
| 4 | ECHETMS | PTMDS | MTMS | 12,000 |
| 4-1 | PTMS | PTMDS | PTMS | 15,000 |
| 4-2 | MTMS | MTMDS | MTMS | 16,000 |
| 4-3 | GPTMS | GPTMDS | GPTMS | 56,000 |
| 4-4 | MAPTMS | MAPTMDS | MAPTMS | 9500 |
| 4-5 | ECHETMS | ECHETMDS | ECHETMS | 7500 |
| 4-6 | ECHETMS | MTMDS | MTMS | 16,000 |
| 4-7 | ECHETMS | GPTMDS | GPTMS | 23,000 |
| 4-8 | ECHETMS | MAPTMDS | MAPTMS | 9500 |
| 4-9 | PTMS | ECHETMDS | ECHETMS | 72,000 |
| 4-10 | PTMS | MTMDS | MTMS | 68,000 |
| 4-11 | PTMS | GPTMDS | GPTMS | 11,000 |
| 4-12 | PTMS | MAPTMDS | MAPTMS | 110,000 |
| 4-13 | MTMS | ECHETMDS | ECHETMS | 23,000 |
| 4-14 | MTMS | PTMDS | PTMS | 9500 |
| 4-15 | MTMS | GPTMDS | GPTMS | 64,000 |
| 4-16 | MTMS | MAPTMDS | MAPTMS | 12,000 |
| 4-17 | GPTMS | ECHETMDS | ECHETMS | 8000 |
| 4-18 | GPTMS | PTMDS | PTMS | 451,000 |
| 4-19 | GPTMS | MTMDS | MTMS | 320,000 |
| 4-20 | GPTMS | MAPTMDS | MAPTMS | 15,000 |
| 4-21 | MAPTMS | ECHETMDS | ECHETMS | 45,000 |
| 4-22 | MAPTMS | PTMDS | PTMS | 351,000 |
| 4-23 | MAPTMS | MTMDS | MTMS | 14,000 |
| 4-24 | MAPTMS | GPTMDS | GPTMS | 160,000 |

A coating composition was prepared according to the same method as Example 1-d except for using the silsesquioxane composite polymer according to Example 4, and then it was coated and cured on a PC substrate like Example 1-e. The coated PC substrate had an intermediate interface layer that was clearly distinguished between the polycarbonate substrate and the coating layer despite coating once.

Example 5: Synthesis of D-A-B-D Structure Composite Silsesquioxane Polymer

In order to produce a D-A-B-D structure composite polymer, the following examples were used, and a coating composition was produced according to the same method as in Example 1.

[Example 5-a] pH Conversion Reaction (Introduction of B,D Structure) for Excessive Production of D Structure 5 parts by weight of a 0.36 wt % HCl aqueous solution was slowly added in a dropwise fashion to the mixed solution of Example 4-b under reaction to parts adjust pH to acidic, and the mixture was stirred for 30 minutes. Subsequently, 25 parts by weight of diphenyltetramethoxydisiloxane which was 5 times as much as that of Example 4-b was added at one time thereto in a dropwise fashion, the mixture was stirred for one hour, and 5 parts by weight of the catalyst of Example 1-a was added thereto to adjust pH of the mixed solution to a basic state. When a reaction was complete, the temperature was changed to room temperature, and tetrahydrofuran in the mixed solution was removed under vacuum to convert the entire reactant into an aqueous solution mixture. After mixing and stirring the aqueous solution mixture for 4 hours, a part was taken therefrom and analyzed through $^{29}$Si-NMR and $^1$H-NMR, and as a result, an amount of an alkoxy group in a B structure was changed to 0.012 mmol/g, and repeating units B and D were introduced in a ratio of about 1:9. In addition, a styrene-reduced molecular weight was 24,000. Further, since a molecular weight distribution of a single cage-type material was not found in a GPC shape of a polymer despite introduction of a cage-type structure, a cage structure was well introduced into a polymer chain through a continuous reaction.

$^1$H-NMR (CDCl$_3$) δ 7.5, 7.2, 3.7, 3.4, 3.3 (broad), 3.1, 2.8, 2.6, 1.5 (broad), 0.6. $^{29}$Si-NMR (CDCl$_3$) δ −72.5 (broad), −81.1 (sharp), −80.8 (sharp), −79.9 (sharp), −82.5 (broad)

[Example 5-b] Introduction of X into B Structure (Introduction of B,D Structure)

After preparing an organic layer of the resulting material of Example 5-a without separate purification, a trifunctional monomer was used to convert its terminal end into a cage structure. 100 parts by weight of the material according to Example 5-a was dissolved in 50 parts by weight of tetrahydrofuran, and 5 parts by weight of distilled water was added thereto to prepare a mixed solution. Subsequently, 10 parts by weight of 0.36 wt % HCl was added to the mixed solution, the mixture was stirred for 10 minutes, and 3 parts by weight of methyltrimethoxysilane was added at one time thereto in a dropwise fashion to secure stable hydrolysis. After stirring for 24 hours, 3 parts by weight of the catalyst of Example 4-a was added thereto to adjust pH of the mixed solution to a basic state. Herein, a cage-shaped polymer was introduced into X of a B structure, and a polymer of Chemical Formula 5 was formed through a continuous reaction in a reactor. However, the polymer was obtained with other byproducts and thus needed separate purification. Subsequently, the temperature was changed to room temperature, and tetrahydrofuran in the mixed solution was removed under vacuum and prepared for purification.

[Example 5-c] Removal of Byproducts Through Precipitation and Recrystallization and Obtaining Resulting Material 200 parts by weight of methylene chloride was added to the mixture with a reaction completed in Example 5-b and used for separate washing with distilled water, and when a distilled water layer showed neutral pH, a solvent therein was completely removed under vacuum decompression. Subsequently, the resultant was precipitated in methanol twice to remove an unreacted monomer, a precipitate therefrom was dissolved in 30 parts by weight of a mixed solvent of tetrahydrofuran and an aqueous solution in a weight ratio of 9.5:0.5, and the solution was stored at −20° C. for 2 days. This is to recrystallize a material not introduced into a polymer but closed to have a cage structure and thus facilitate its purification.

Solid materials obtained after the recrystallization were filtered and vacuum-decompressed to obtain a polymer represented by Chemical Formula 5 without other byproducts. In addition, comparing GPC results with NMR results, a sharp cage-shape without a low molecular weight was obtained alone in each polymer growth, and thus a composite polymer was obtained without a problem. Herein, a styrene-reduced molecular weight was 16,000, n of X was 4-6, n of Y was 4-6, and particularly, a result of Chemical Formula 5 was as follows.

$^{29}$Si-NMR (CDCl$_3$) δ −72.5 (broad), −81.1 (sharp), −80.8 (sharp), −79.9 (sharp), −81.5 (sharp), −82.5 (broad)

In addition, monomers shown in Table 23 were applied to prepare a silsesquioxane composite polymer and a coating composition. Herein, the method used in Example 5 was equally applied as a producing method.

TABLE 23

| Example method No. | Monomer 4-b method is applied | Monomer 4-a method is applied | Monomer 5-b method is applied | Molecular weight (Mw) |
|---|---|---|---|---|
| 2 | ECHETMS | PTMDS | MTMS | 16,000 |
| 5-1 | PTMS | PTMDS | PTMS | 19,000 |
| 5-2 | MTMS | MTMDS | MTMS | 20,000 |
| 5-3 | GPTMS | GPTMDS | GPTMS | 63,000 |
| 5-4 | MAPTMS | MAPTMDS | MAPTMS | 12,000 |
| 5-5 | ECHETMS | ECHETMDS | ECHETMS | 14,500 |
| 5-6 | ECHETMS | MTMDS | MTMS | 19,000 |
| 5-7 | ECHETMS | GPTMDS | GPTMS | 25,000 |
| 5-8 | ECHETMS | MAPTMDS | MAPTMS | 11,500 |
| 5-9 | PTMS | ECHETMDS | ECHETMS | 78,000 |
| 5-10 | PTMS | MTMDS | MTMS | 79,000 |
| 5-11 | PTMS | GPTMDS | GPTMS | 15,000 |
| 5-12 | PTMS | MAPTMDS | MAPTMS | 124,000 |
| 5-13 | MTMS | ECHETMDS | ECHETMS | 30,000 |
| 5-14 | MTMS | PTMDS | PTMS | 12,000 |
| 5-15 | MTMS | GPTMDS | GPTMS | 64,000 |
| 5-16 | MTMS | MAPTMDS | MAPTMS | 13,000 |
| 5-17 | GPTMS | ECHETMDS | ECHETMS | 12,000 |
| 5-18 | GPTMS | PTMDS | PTMS | 631,000 |
| 5-19 | GPTMS | MTMDS | MTMS | 421,000 |
| 5-20 | GPTMS | MAPTMDS | MAPTMS | 18,000 |
| 5-21 | MAPTMS | ECHETMDS | ECHETMS | 65,000 |
| 2-22 | MAPTMS | PTMDS | PTMS | 425,000 |
| 5-23 | MAPTMS | MTMDS | MTMS | 25,000 |
| 5-24 | MAPTMS | GPTMDS | GPTMS | 213,000 |

A coating composition was prepared according to the same method as Example 1-d except for using the silsesquioxane composite polymer according to Example 5, and then coated and cured on a PC substrate like Example 1-e. The coated PC substrate had an intermediate interface layer that was clearly distinguished between the polycarbonate substrate and the coating layer despite coating once.

Example 6: Synthesis of Silsesquioxane E-A-B-D Structure Composite Polymer

In order to produce the E-A-B-D structure composite polymer, the following examples were used, and a coating composition was produced according to the same method as in Example 1.

[Example 6-a] Production of Chain Terminal End E Structure 20 parts by weight of methylene chloride was added to the mixture of Example 4-c in a dropwise fashion without separate purification, 5 parts by weight of a 0.36 wt % HCl aqueous solution was added thereto in a dropwise fashion to adjust pH to acidic, and the mixture was stirred at 4° C. for 30 minutes. Subsequently, 1 part by weight of dimethyltetramethoxysilane was added at one time thereto in a dropwise fashion. Herein, moieties not hydrolyzed in a molecular structure were easily converted through hydrolysis in an acid aqueous solution layer separated from a solvent and condensed with a separately produced reactant in an organic solvent layer to introduce E into a terminal end unit. After stirring for 5 hours, the stirring of a reaction was stopped, and the temperature in a reactor was adjusted to room temperature.

[Example 6-b] Introduction of Cage into X of B Structure and Terminal End E Structure An organic layer of the resulting material of Example 6-a was prepared without separate purification, and a trifunctional monomer was used to convert its terminal end into a cage structure. 3 parts by weight of methyltrimethoxysilane was added at one time in a dropwise fashion to the mixed solution of Example 6-a under reaction to secure stable hydrolysis, and after stirring for 24 hours, 3 parts by weight of the catalyst of Example 1-a was added thereto again to adjust pH of the mixed solution to a basic state. Herein, a cage-shaped polymer was introduced into a terminal end of an E structure, and a polymer of Chemical Formula 6 was formed through a continuous reaction in a reactor. Herein, the polymer was obtained with other byproducts and needed separate purification. Then, the temperature was changed to room temperature, and tetrahydrofuran in the mixed solution was removed under vacuum and prepared for purification.

[Example 6-c] Removal of Byproducts Through Precipitation and Recrystallization and Obtaining Resulting Material The mixture of Example 6-b with a reaction completed was washed with distilled water, and when a distilled water layer showed neutral pH, a solvent was completely removed under vacuum decompression. Subsequently, the resultant was precipitated twice in methanol to remove an unreacted monomer, 30 parts by weight of a precipitate therefrom was dissolved in a mixed solvent of tetrahydrofuran and an aqueous solution in a weight ratio of 9.5:0.5, and the solution was stored at −20° C. for 2 days. This is to recrystallize a material not introduced into a polymer but closed into a cage structure and thus facilitate purification.

After the recrystallization, the obtained solid materials were filtered and vacuum-decompressed to obtain a polymer represented by Chemical Formula 6 with other byproducts. In addition, comparing GPC results with NMR results, a sharp cage shape without a low molecular weight was obtained alone in each polymer growth step, and thus a composite polymer was obtained without a problem. Herein, a styrene-reduced molecular weight was 21,000, n of X was 4-6, n of Y was 4-6, and particularly, a result of Chemical Formula 6 is as follows.

$^{29}$Si-NMR (CDCl$_3$) δ −68.2, −71.8 (sharp). −72.3 (broad), −81.1 (sharp), −80.8 (sharp), −82.5 (broad)

In addition, monomers shown in Table 24 were applied to prepare a silsesquioxane composite polymer. Herein, the method used in Example 6 was equally applied as a producing method.

TABLE 24

| Example method No. | Monomer 4-b method is applied | Monomer 4-c method is applied | Monomer 6-a method is applied | Monomer 6-b method is applied | Mw |
|---|---|---|---|---|---|
| 6 | ECHETMS | PTMDS | MTMDS | MAPTMS | 21,000 |
| 6-1 | ECHETMS | ECHETMDS | ECHETMDS | ECHETMS | 18,000 |
| 6-2 | PTMS | PTMDS | PTMDS | PTMS | 19,000 |
| 6-3 | MTMS | MTMDS | MTMDS | MTMS | 31,000 |
| 6-4 | GPTMS | ECHETMDS | GPTMDS | GPTMS | 63,000 |
| 6-5 | MAPTMS | MAPTMDS | MAPTMDS | MAPTMS | 125,000 |
| 6-6 | ECHETMS | ECHETMDS | PTMDS | PTMS | 18,000 |
| 6-7 | ECHETMS | ECHETMDS | MTMDS | MTMS | 14,000 |
| 6-8 | ECHETMS | ECHETMDS | GPTMDS | GPTMS | 20,000 |
| 6-9 | ECHETMS | ECHETMDS | MAPTMDS | MAPTMS | 91,000 |
| 6-10 | ECHETMS | PTMDS | ECHETMDS | ECHETMS | 18,000 |
| 6-11 | ECHETMS | MTMDS | ECHETMDS | ECHETMS | 121,000 |
| 6-12 | ECHETMS | GPTMDS | ECHETMDS | ECHETMS | 80,000 |
| 6-13 | ECHETMS | MAPTMDS | ECHETMDS | ECHETMS | 112,000 |
| 6-14 | PTMS | PTMDS | ECHETMDS | ECHETMS | 35,000 |
| 6-15 | PTMS | PTMDS | MTMDS | MTMS | 91,000 |
| 6-16 | PTMS | PTMDS | ECHETMDS | ECHETMS | 45,000 |
| 6-17 | PTMS | PTMDS | MAPTMDS | MAPTMS | 75,000 |
| 6-18 | PTMS | ECHETMDS | PTMDS | PTMS | 140,000 |
| 6-19 | PTMS | MTMDS | PTMDS | PTMS | 220,000 |
| 6-20 | PTMS | GPTMDS | PTMDS | PTMS | 51,000 |
| 6-21 | PTMS | MAPTMDS | PTMDS | PTMS | 73,000 |
| 6-22 | MTMS | MTMDS | ECHETMDS | ECHETMS | 69,000 |
| 6-23 | MTMS | MTMDS | PTMDS | PTMS | 51,000 |

TABLE 24-continued

| Example method No. | Monomer 4-b method is applied | Monomer 4-c method is applied | Monomer 6-a method is applied | Monomer 6-b method is applied | Mw |
|---|---|---|---|---|---|
| 6-24 | MTMS | MTMDS | GPTMDS | GPTMS | 91,000 |
| 6-25 | MTMS | MTMDS | MAPTMDS | MAPTMS | 128,000 |
| 6-26 | MTMS | ECHETMDS | MTMDS | MTMS | 68,000 |
| 6-27 | MTMS | PTMDS | MTMDS | MTMS | 45,000 |
| 6-28 | MTMS | GPTMDS | MTMDS | MTMS | 265,000 |
| 6-29 | MTMS | MAPTMDS | MTMDS | MTMS | 105,000 |
| 6-30 | GPTMS | GPTMDS | ECHETMDS | ECHETMS | 101,000 |
| 6-31 | GPTMS | GPTMDS | PTMDS | PTMS | 95,000 |
| 6-32 | GPTMS | GPTMDS | MTMDS | MTMS | 73,000 |
| 6-33 | GPTMS | GPTMDS | MAPTMDS | MAPTMS | 51,000 |
| 6-34 | GPTMS | ECHETMDS | GPTMDS | GPTMS | 31,000 |
| 6-35 | GPTMS | PTMDS | GPTMDS | GPTMS | 315,000 |
| 6-36 | GPTMS | MTMDS | GPTMDS | GPTMS | 125,000 |
| 6-37 | GPTMS | MAPTMDS | GPTMDS | GPTMS | 45,000 |
| 6-38 | MAPTMS | MAPTMDS | ECHETMDS | ECHETMS | 94,000 |
| 6-39 | MAPTMS | MAPTMDS | PTMDS | PTMS | 35,000 |
| 6-40 | MAPTMS | MAPTMDS | MTMDS | MTMS | 80,000 |
| 6-41 | MAPTMS | MAPTMDS | GPTMDS | GPTMS | 83,000 |
| 6-42 | MAPTMS | ECHETMDS | MAPTMDS | MAPTMS | 74,000 |
| 6-43 | MAPTMS | PTMDS | MAPTMDS | MAPTMS | 10,000 |
| 6-44 | MAPTMS | MTMDS | MAPTMDS | MAPTMS | 65,000 |
| 6-45 | MAPTMS | GPTMDS | MAPTMDS | MAPTMS | 418,000 |

A coating composition was prepared according to the same method as Example 1-d except for using the silsesquioxane composite polymer according to Example 6, and then coated and cured on a PC substrate like Example 1-e. The coated PC substrate had an intermediate interface layer that was clearly distinguished between the polycarbonate substrate and the coating layer despite coating once.

Example 7: Synthesis of Silsesquioxane A-B-A-D Structure Composite Polymer

Synthesis steps of continuous hydrolysis and condensation were performed by stages as follows, and a coating composition was produced according to the same method as in Example 1.

[Example 7-a] Preparation of Catalyst

In order to control basicity, a 25 wt % tetramethylammonium hydroxide (TMAH) aqueous solution was mixed with a 10 wt % potassium hydroxide (KOH) aqueous solution to produce Catalyst 1a.

[Example 7-b] Synthesis of Linear Silsesquioxane (A Precursor)

5 parts by weight of distilled water, 15 parts by weight of tetrahydrofuran, and 1 part by weight of the catalyst produced in Example 7-a were added in a dropwise fashion to a dried flask mounted with a condensing tube and an agitator, and then stirred for 1 hour at room temperature, 20 parts by weight of 2-(3,4-epoxycyclohexyl)ethyltrimethoxysilane were added in a dropwise fashion, 15 parts by weight of tetrahydrofuran were added in a dropwise fashion, and the mixture was further stirred for 5 hours. The mixed solution during the stirring was taken out, washed twice to remove the catalyst and impurities, and then filtered, and as a result of IR analysis, a Si—OH functional group (3200 cm$^{-1}$) was produced at the terminal end, and the silsesquioxane having a linear structure had a styrene-reduced molecular weight of 6000.

[Example 7-c] Synthesis of Linear Silsesquioxane Structure (Synthesis of A-B Precursor)

5 parts by weight of distilled water, 40 parts by weight of tetrahydrofuran, and 0.5 parts by weight of the catalyst produced in Example 7-a were added in a dropwise fashion to a dried flask mounted with a condensing tube and an agitator and stirred for 1 hour at room temperature, 10 parts by weight of 2-(3,4-epoxycyclohexyl)ethyltrimethoxysilane were added in a dropwise fashion, 20 parts by weight of tetrahydrofuran were added in a dropwise fashion, and the mixture was further stirred for 2 hours. The mixed solution during the stirring was taken out, washed twice to remove a catalyst and impurities, and filtered to obtain linear silsesquioxane in which less than or equal to 0.1 mmol/g of an alkoxy group remained, which was confirmed through $^1$H-NMR analysis, and used to introduce a cage thereinto through a continuous reaction. The linear silsesquioxane turned out to have an overall linear structure through an XRD analysis. As a result of measuring a molecular weight, the silsesquioxane having a linear structure had a styrene-reduced molecular weight of 8000.

[Example 7-d] Synthesis of Linear Silsesquioxane Structure (Synthesis of A-B-A Precursor)

5 parts by weight of distilled water, 5 parts by weight of tetrahydrofuran, and 10 parts by weight of the catalyst produced in Example 7-a were added in a dropwise fashion to a dried flask mounted with a condensing tube and an agitator and stirred for 1 hour at room temperature, 20 parts by weight of each precursor of Examples 7-b and 7-c were added thereto in a dropwise fashion, 10 parts by weight of tetrahydrofuran was added thereto in a dropwise fashion, and the mixture was further stirred for 24 hours. The mixed solution during the stirring was taken out, washed twice to remove the catalyst and impurities, and then filtered, and then a Si—OH functional group was produced at the terminal end through IR analysis (3200 cm$^{-1}$), and the silsesquioxane having a linear structure had a styrene-reduced molecular weight of 15,000.

$^1$H-NMR (CDCl$_3$) δ 3.7, 3.4, 3.3 (broad), 3.1, 2.8, 2.6, 1.5 (broad), 0.6.

[Example 7-e] Producing Continuous Cage Structure (Introduction of D Structure)

5 parts by weight of a 0.36 wt % HCl aqueous solution was very slowly added to the mixed solution of Example 7-d in a dropwise fashion to adjust pH to acidic, and the mixture was stirred at 4° C. for 30 minutes. Subsequently, 5 parts by weight of diphenyltetramethoxydisiloxane was added at one time thereto in a dropwise fashion to secure stable hydrolysis, the mixture was stirred for 1 hour, and 7 parts by weight of the catalyst of Example 7-a was added thereto again to adjust pH of the mixed solution to a basic state. Herein, a precursor having a D structure with an open alkoxy was formed, apart from the linear polymer. A small amount of a sample was taken out and analyzed through H-NMR and IR to obtain a residual rate of methoxy, and when the residual rate was 10%, 10 parts by weight of a 0.36 wt % HCl aqueous solution was slowly added thereto in a dropwise fashion to adjust pH to acidic. Subsequently, 1 part by weight of phenyltrimethoxysilane was added at one time thereto in a dropwise fashion, the mixture was stirred for 15 minutes, and 20 parts by weight of the catalyst of Example 1-a was added thereto. After stirring for 4 hours, a cage-shaped polymer was produced. Then, the temperature was changed to room temperature, and tetrahydrofuran in the mixed solution was removed under vacuum to convert the entire reactant into an aqueous solution mixture. After stirring for 4 hours, a part was taken therefrom and analyzed through $^{29}$Si-NMR, and as a result, two sharp peaks of a structure introduced by using a phenyl group were shown, and a polymer represented by Chemical Formula 7 was produced without separately remaining byproducts. In addition, a styrene-reduced molecular weight was 18,000.

$^{29}$Si-NMR (CDCl$_3$) δ −68.2, −72.3 (broad), −81.1 (sharp), −80.8 (sharp), −82.5 (broad)

[Example 7-f] Introduction of X into B Structure (Completion of A-B-A-D Structure)

An organic layer of the resulting material of Example 7-e was prepared without separate purification, and trifunctional monomers were used to convert its terminal end into a cage structure. 100 parts by weight of the material of Example 7-e was dissolved in 50 parts by weight of tetrahydrofuran, and 5 parts by weight of distilled water was added thereto to prepare a mixed solution. Subsequently, 10 parts by weight of 0.36 wt % HCl was added to the mixed solution, the mixture was stirred for 10 minutes, and 3 parts by weight of methyltrimethoxysilane was added at one time thereto in a dropwise fashion to secure stable hydrolysis. After stirring for 24 hours, 3 parts by weight of the catalyst of Example 7-a was added thereto again to adjust pH of the mixed solution to a basic state. Herein, a cage-shaped polymer was introduced into X of a B structure, and a reaction was continuously performed in a reactor to form a polymer represented by Chemical Formula 7. However, the polymer with other byproducts was obtained and thus needed separate purification. Then, the temperature was changed to room temperature, and tetrahydrofuran in the mixed solution was removed under vacuum and prepared for purification.

[Example 7-g] Removal of Byproducts Through Precipitation and Recrystallization and Obtaining Resulting Material 200 parts by weight of methylene chloride was added to the mixture with a reaction completed in Example 7-f and used for separate washing along with distilled water, and when a distilled water layer showed neutral pH, a solvent therein was completely removed under vacuum decompression. Then, the resultant was precipitated twice in methanol to remove an unreacted monomer, 30 parts by weight of a precipitate therefrom was dissolved in a mixed solvent of tetrahydrofuran and an aqueous solution in a weight ratio of 9.5:0.5, and the solution was stored at −20° C. for 2 days. This is to recrystallize a material not introduced into the polymer but closed into a cage structure to facilitate purification.

After the recrystallization, a solid material obtained therefrom was filtered to obtain a polymer represented by Chemical Formula 7 through vacuum decompression without other byproducts. In addition, comparing GPC results with NMR results, a sharp cage shape without a low molecular weight was obtained alone in each polymer growth step, and thus a composite polymer turned out to be obtained without a problem. Herein, a styrene-reduced molecular weight was 24,000, n of X was 4-6, and n of Y was 4-6.

In addition, monomers in Table 25 were applied to prepare a silsesquioxane composite polymer. Herein, the method of Example 7 was equally applied as a producing method.

TABLE 25

| Example method No. | Monomer 7-b, c method is applied monomer | Monomer 7-e method is applied | Monomer 7-f method is applied | Molecular weight (Mw) |
|---|---|---|---|---|
| 7 | ECHETMS | PTMDS | MTMS | 24,000 |
| 7-1 | PTMS | PTMDS | PTMS | 11,000 |
| 7-2 | MTMS | MTMDS | MTMS | 13,000 |
| 7-3 | GPTMS | GPTMDS | GPTMS | 23,000 |
| 7-4 | MAPTMS | MAPTMDS | MAPTMS | 14,500 |
| 7-5 | ECHETMS | ECHETMDS | ECHETMS | 12,500 |
| 7-6 | ECHETMS | MTMDS | MTMS | 53,000 |
| 7-7 | ECHETMS | GPTMDS | GPTMS | 11,000 |
| 7-8 | ECHETMS | MAPTMDS | MAPTMS | 9000 |
| 7-9 | PTMS | ECHETMDS | ECHETMS | 48,000 |
| 7-10 | PTMS | MTMDS | MTMS | 90,000 |
| 7-11 | PTMS | GPTMDS | GPTMS | 32,000 |
| 7-12 | PTMS | MAPTMDS | MAPTMS | 150,000 |
| 7-13 | MTMS | ECHETMDS | ECHETMS | 17,000 |
| 7-14 | MTMS | PTMDS | PTMS | 38,500 |
| 7-15 | MTMS | GPTMDS | GPTMS | 15,000 |
| 7-16 | MTMS | MAPTMDS | MAPTMS | 17,000 |
| 7-17 | GPTMS | ECHETMDS | ECHETMS | 6000 |
| 7-18 | GPTMS | PTMDS | PTMS | 18,000 |
| 7-19 | GPTMS | MTMDS | MTMS | 457,000 |
| 7-20 | GPTMS | MAPTMDS | MAPTMS | 16,000 |
| 7-21 | MAPTMS | ECHETMDS | ECHETMS | 97,000 |
| 7-22 | MAPTMS | PTMDS | PTMS | 951,000 |
| 7-23 | MAPTMS | MTMDS | MTMS | 15,000 |
| 7-24 | MAPTMS | GPTMDS | GPTMS | 12,000 |

A coating composition was prepared according to the same method as Example 1-d except for using the silsesquioxane composite polymer of Example 7, and then coated and cured on a PC substrate like Example 1-e. The coated PC substrate had an intermediate interface layer that was clearly distinguished between the polycarbonate substrate and the coating layer despite coating once.

Example 8: Synthesis of D-A-B-A-D Structure Composite Silsesquioxane Polymer

In order to produce a D-A-B-D structure composite polymer, the following examples were used, and a coating composition was produced according to the same method as in Example 1.

[Example 8-a] pH Conversion Reaction for Excessive Production of D Structure 15 parts by weight of a 0.36 wt % HCl aqueous solution was very slowly added to the mixed solution of Example 7-d under reaction in a dropwise fashion to adjust pH to acidic, and the mixture was stirred at 4° C. for 30 minutes. Then, 25 parts by weight of diphenyltetramethoxydisiloxane which is five times as much as that of Example 7-e was added at one time thereto in a dropwise fashion, the mixture was stirred for 1 hour, and 20 parts by weight of the catalyst of Example 7-a was added thereto to adjust pH of the mixed solution to a basic state. When a reaction was complete, the temperature was changed to room temperature, and tetrahydrofuran in the mixed solution was removed under vacuum to convert the entire reactant into an aqueous solution mixture.

After mixing and stirring for 4 hours, a part was taken therefrom and analyzed through $^{29}$Si-NMR and $^{1}$H-NMR, and as a result, an amount of an alkoxy group in a B structure was changed to 0.006 mmol/g, and repeating units of B and D were introduced in a ratio of about 5:5. In addition, a styrene-reduced molecular weight was 32,000. Furthermore, a cage type of structure was introduced into a polymer, but a molecular weight distribution of a single cage type of material was not found in a GPC shape of the polymer, and thus the cage structure was well introduced into a polymer chain through a continuous reaction.

$^{1}$H-NMR (CDCl$_3$) δ 7.5, 7.2, 3.7, 3.4, 3.3 (broad), 3.1, 2.8, 2.6, 1.5 (broad), 0.6. $^{29}$Si-NMR (CDCl$_3$) δ −72.5 (broad), −81.1 (sharp), −80.8 (sharp), −79.9 (sharp), −82.5 (broad)

[Example 8-b] Introduction of X into B Structure

An organic layer of the resulting material according to Example 8-a was prepared without separate purification, and its terminal end was converted into a cage structure by using a trifunctional monomer. 100 parts by weight of the material of Example 8-a was dissolved in 50 parts by weight of tetrahydrofuran, and 5 parts by weight of distilled water was added thereto to prepare a mixed solution. Subsequently, 10 parts by weight of 0.36 wt % HCl was added to the mixed solution, the obtained mixture was stirred for 10 minutes, and 3 parts by weight of methyltrimethoxysilane was added at one time thereto in a dropwise fashion to secure stable hydrolysis. After stirring for 24 hours, 3 parts by weight of the catalyst according to Example 7-a was added thereto again to adjust pH of a mixed solution to a basic state. Herein, a cage-shaped polymer was introduced into X of a B structure, and a polymer represented by Chemical Formula 8 was formed through a continuous reaction in a reactor. However, the polymer was obtained with other byproducts and thus needed separate purification. Subsequently, the temperature was changed to room temperature, and tetrahydrofuran in the mixed solution was removed under vacuum and prepared for purification.

[Example 8-c] Removal of Byproducts Through Precipitation and Recrystallization and Obtaining Resulting Material 200 parts by weight of methylene chloride was added to the mixture with the reaction completed according to Example 8-b and used for separate washing along with distilled water, and when a distilled water layer showed neutral pH, a solvent therein was completely removed under vacuum decompression. Subsequently, the resultant was precipitated twice in methanol to remove an unreacted monomer, 30 parts by weight of a precipitate was dissolved in a mixed solvent of tetrahydrofuran and an aqueous solution in a weight ratio of 9.5:0.5, and the solution was stored at −20° C. for 2 days. This is to recrystallize a material not introduced but closed to have a cage structure and facilitate purification.

Solid materials obtained after the recrystallization were filtered to obtain a polymer represented by Chemical Formula 1 without other byproducts through vacuum decompression. In addition, comparing GPC results with NMR results, a sharp cage-shaped polymer without a low molecular weight was obtained alone in each growth step, and accordingly, a composite polymer turned out to be produced without a problem. Herein, a styrene-reduced molecular weight of the polymer was 36,000, n of X was 4-6, and n of Y was 4-6, and particularly, results of Chemical Formula 8 are as follows.

$^{29}$Si-NMR (CDCl$_3$) δ −72.5 (broad), −81.1 (sharp), −80.8 (sharp), −79.9 (sharp), −81.5 (sharp), −82.5 (broad)

In addition, monomers shown in Table 26 were applied to prepare a silsesquioxane composite polymer and a coating composition. Herein, the method used in Example 8 was applied as a producing method.

TABLE 26

| Example method No. | Monomer 7-b, c method is applied | Monomer 8-a method is applied | Monomer 8-b method is applied | Molecular weight (Mw) |
|---|---|---|---|---|
| 8 | ECHETMS | PTMDS | MTMS | 36,000 |
| 8-1 | PTMS | PTMDS | PTMS | 14,000 |
| 8-2 | MTMS | MTMDS | MTMS | 18,000 |
| 8-3 | GPTMS | GPTMDS | GPTMS | 27,000 |
| 8-4 | MAPTMS | MAPTMDS | MAPTMS | 19,500 |
| 8-5 | ECHETMS | ECHETMDS | ECHETMS | 19,500 |
| 8-6 | ECHETMS | MTMDS | MTMS | 58,000 |
| 8-7 | ECHETMS | GPTMDS | GPTMS | 19,000 |
| 8-8 | ECHETMS | MAPTMDS | MAPTMS | 12,000 |
| 8-9 | PTMS | ECHETMDS | ECHETMS | 53,000 |
| 8-10 | PTMS | MTMDS | MTMS | 113,000 |
| 8-11 | PTMS | GPTMDS | GPTMS | 42,000 |
| 8-12 | PTMS | MAPTMDS | MAPTMS | 173,000 |
| 8-13 | MTMS | ECHETMDS | ECHETMS | 19,000 |
| 8-14 | MTMS | PTMDS | PTMS | 45,000 |
| 8-15 | MTMS | GPTMDS | GPTMS | 32,000 |
| 8-16 | MTMS | MAPTMDS | MAPTMS | 34,000 |
| 8-17 | GPTMS | ECHETMDS | ECHETMS | 12,000 |
| 8-18 | GPTMS | PTMDS | PTMS | 24,000 |
| 8-19 | GPTMS | MTMDS | MTMS | 486,000 |
| 8-20 | GPTMS | MAPTMDS | MAPTMS | 32,000 |
| 8-21 | MAPTMS | ECHETMDS | ECHETMS | 181,000 |
| 8-22 | MAPTMS | PTMDS | PTMS | 981,000 |
| 8-23 | MAPTMS | MTMDS | MTMS | 21,000 |
| 8-24 | MAPTMS | GPTMDS | GPTMS | 20,000 |

A coating composition was prepared according to the same method as Example 1-d except for using the silsesquioxane composite polymer of Example 8, and then coated and cured on a PC substrate like Example 1-e. The coated PC substrate had an intermediate interface layer that was clearly distinguished between the polycarbonate substrate and the coating layer despite coating once.

Example 9: Synthesis of Silsesquioxane E-A-B-A-D Structure Composite Polymer

In order to produce an E-A-B-A-D structure composite polymer, the following examples were used, and a coating composition was produced according to the same method as in Example 1.

[Example 9-a] Production of Chain Terminal End E Structure 20 parts by weight of methylene chloride was added in a dropwise fashion to the mixture of Example 7-g without separate purification, 5 parts by weight of a 0.36 wt % HCl aqueous solution was added thereto in a dropwise fashion to adjust pH to acidic, and the mixture was stirred at 4° C. for 30 minutes. Subsequently, 1 part by weight of dimethyltetramethoxysilane was added at one time thereto in a dropwise fashion. Herein, moieties not hydrolyzed but remaining in a molecular structure were easily converted into a hydrolyzed product in an acid aqueous solution layer separated from a solvent and thus condensed with other separate reactants in an organic solvent layer to introduce E into a terminal end unit. After stirring for 5 hours, the stirring of a reaction was stopped, and the temperature in the reactor was adjusted to room temperature.

[Example 9-b] Introduction of Cage into X of B Structure and Terminal End E Structure An organic layer of the resulting material according to Example 9-a was prepared without separate purification, and its terminal end was converted into a cage structure by using a trifunctional monomer. 3 parts by weight of methyltrimethoxysilane was added at one time in a dropwise fashion to the mixed solution of Example 9-a under reaction to secure stable hydrolysis, the mixture was stirred for 24 hours, and 3 parts by weight of the catalyst of Example 7-a was added thereto again to adjust pH of the mixed solution to a basic state. Herein, a cage-shaped polymer was introduced into a terminal end of an E structure, and a polymer represented by Chemical Formula 9 was formed through a continuous reaction in a reactor. However, the polymer was obtained with other byproducts without separate purification. Subsequently, the temperature was changed to room temperature, and tetrahydrofuran in the mixed solution was removed under vacuum and prepared for purification.

[Example 9-c] Removal of Byproducts Through Precipitation and Recrystallization and Obtaining Resulting Material The mixture with the reaction completed in Example 9-b was obtained and washed with distilled water, and when a distilled water layer showed neutral pH, a solvent therein was completely removed under vacuum decompression. Subsequently, the resultant was precipitated twice in methanol to remove an unreacted monomer, 30 parts by weight of a precipitate obtained therefrom was dissolved in a mixed solvent of tetrahydrofuran and an aqueous solution in a weight ratio of 9.5:0.5, and the solution was stored at −20° C. for 2 days. This is to recrystallize a material not introduced but closed to have a cage structure and facilitate purification.

Solid materials after the recrystallization were filtered and vacuum-decompressed to obtain a polymer represented by Chemical Formula 9 with other byproducts. In addition, comparing GPC results with NMR results, a sharp cage-shaped polymer without a low molecular weight was obtained alone in each polymer growth step, and accordingly, a composite polymer turned out to be obtained without a problem. Herein, a styrene-reduced molecular weight of the polymer was 28,000, n of X was 4-6, and n of Y was 4-6.

In addition, monomers shown in Table 27 were applied to prepare a silsesquioxane composite polymer. Herein, the method used in Example 9 was equally used as a producing method.

TABLE 27

| Example method No. | Monomer 7-b, c method is applied | Monomer 7-e method is applied | Monomer 9-a method is applied | Monomer 9-b method is applied | Mw |
|---|---|---|---|---|---|
| 9 | ECHETMS | PTMDS | MTMDS | MAPTMS | 28,000 |
| 9-1 | ECHETMS | ECHETMDS | ECHETMDS | ECHETMS | 24,000 |
| 9-2 | PTMS | PTMDS | PTMDS | PTMS | 21,000 |
| 9-3 | MTMS | MTMDS | MTMDS | MTMS | 36,000 |
| 9-4 | GPTMS | ECHETMDS | GPTMDS | GPTMS | 62,000 |
| 9-5 | MAPTMS | MAPTMDS | MAPTMDS | MAPTMS | 153,000 |
| 9-6 | ECHETMS | ECHETMDS | PTMDS | PTMS | 24,000 |
| 9-7 | ECHETMS | ECHETMDS | MTMDS | MTMS | 19,000 |
| 9-8 | ECHETMS | ECHETMDS | GPTMDS | GPTMS | 26,000 |
| 9-9 | ECHETMS | ECHETMDS | MAPTMDS | MAPTMS | 99,000 |
| 9-10 | ECHETMS | PTMDS | ECHETMDS | ECHETMS | 21,000 |
| 9-11 | ECHETMS | MTMDS | ECHETMDS | ECHETMS | 142,000 |
| 9-12 | ECHETMS | GPTMDS | ECHETMDS | ECHETMS | 70,000 |
| 9-13 | ECHETMS | MAPTMDS | ECHETMDS | ECHETMS | 72,000 |
| 9-14 | PTMS | PTMDS | ECHETMDS | ECHETMS | 15,000 |
| 9-15 | PTMS | PTMDS | MTMDS | MTMS | 51,000 |
| 9-16 | PTMS | PTMDS | ECHETMDS | ECHETMS | 85,000 |
| 9-17 | PTMS | PTMDS | MAPTMDS | MAPTMS | 95,000 |
| 9-18 | PTMS | ECHETMDS | PTMDS | PTMS | 160,000 |
| 9-19 | PTMS | MTMDS | PTMDS | PTMS | 240,000 |
| 9-20 | PTMS | GPTMDS | PTMDS | PTMS | 56,000 |
| 9-21 | PTMS | MAPTMDS | PTMDS | PTMS | 71,000 |
| 9-22 | MTMS | MTMDS | ECHETMDS | ECHETMS | 81,000 |
| 9-23 | MTMS | MTMDS | PTMDS | PTMS | 63,000 |
| 9-24 | MTMS | MTMDS | GPTMDS | GPTMS | 121,000 |
| 9-25 | MTMS | MTMDS | MAPTMDS | MAPTMS | 153,000 |
| 9-26 | MTMS | ECHETMDS | MTMDS | MTMS | 82,000 |
| 9-27 | MTMS | PTMDS | MTMDS | MTMS | 63,000 |
| 9-28 | MTMS | GPTMDS | MTMDS | MTMS | 310,000 |

TABLE 27-continued

| Example method No. | Monomer 7-b, c method is applied | Monomer 7-e method is applied | Monomer 9-a method is applied | Monomer 9-b method is applied | Mw |
|---|---|---|---|---|---|
| 9-29 | MTMS | MAPTMDS | MTMDS | MTMS | 125,000 |
| 9-30 | GPTMS | GPTMDS | ECHETMDS | ECHETMS | 97,000 |
| 9-31 | GPTMS | GPTMDS | PTMDS | PTMS | 45,000 |
| 9-32 | GPTMS | GPTMDS | MTMDS | MTMS | 61,000 |
| 9-33 | GPTMS | GPTMDS | MAPTMDS | MAPTMS | 52,000 |
| 9-34 | GPTMS | ECHETMDS | GPTMDS | GPTMS | 37,000 |
| 9-35 | GPTMS | PTMDS | GPTMDS | GPTMS | 365,000 |
| 9-36 | GPTMS | MTMDS | GPTMDS | GPTMS | 85,000 |
| 9-37 | GPTMS | MAPTMDS | GPTMDS | GPTMS | 75,000 |
| 9-38 | MAPTMS | MAPTMDS | ECHETMDS | ECHETMS | 144,000 |
| 9-39 | MAPTMS | MAPTMDS | PTMDS | PTMS | 85,000 |
| 9-40 | MAPTMS | MAPTMDS | MTMDS | MTMS | 60,000 |
| 9-41 | MAPTMS | MAPTMDS | GPTMDS | GPTMS | 53,000 |
| 9-42 | MAPTMS | ECHETMDS | MAPTMDS | MAPTMS | 12,000 |
| 9-43 | MAPTMS | PTMDS | MAPTMDS | MAPTMS | 10,000 |
| 9-44 | MAPTMS | MTMDS | MAPTMDS | MAPTMS | 32,000 |
| 9-45 | MAPTMS | GPTMDS | MAPTMDS | MAPTMS | 231,000 |

A coating composition was prepared according to the same method as Example 1-d except for using the silsesquioxane composite polymer of Example 9, and then coated and cured on a PC substrate like Example 1-e. The coated PC substrate had an intermediate interface layer that was clearly distinguished between the polycarbonate substrate and the coating layer despite coating once, as shown in FIG. 1.

Characteristics Comparison Depending on Thickness of Intermediate Interface Layer A coating composition was coated on a PC substrate (0.6T, I-Components Co., Ltd.) like Example 9, and cured to manufacture a laminate. Table 28 shows characteristics of the laminate depending on a thickness of an intermediate interface layer.

Adherence Measurement: measured by using a Universal Tensile Machine (UTM) after being allowed to stand at 95° C. under humidity of 85% for 240 hours When a substrate and a coating layer were completely peeled from each other, 0 was given, but when the substrate and the coating layer were not peeled from each other, 100 was given, and thus as the number is larger, adherence is better.

Bending Capability: a substrate bending radius (R) was measured by using a Mandrel tester Transparency: measured with NDH 5000 (Haze Meter). As the number is smaller, transparency is higher, and an optical substrate in general has transparency of less than or equal to 0.5.

Hardness: measured with a Motorized operating-type pencil tester.

As shown in Table 28, adherence and hardness showed excellent results, as a thickness of an intermediate interface layer was thicker. However, when the intermediate interface layer had a thickness of less than 10 nm or greater than 10,000 nm, a substrate bending radius was greater than or equal to 20R, and thus the substrate was easily broken. When the intermediate interface layer had a thickness of greater than 10,000 nm, transparency was greater than or equal to 0.5, and thus optical properties of a laminate was sharply deteriorated.

Accordingly, a laminate of the present invention obtained excellent effects in all the properties such as adherence, bending capabilities, transparency, hardness, and the like, when the laminate included an intermediate interface layer having a thickness ranging from 10 nm to 10,000 nm.

The invention claimed is:

1. A laminate comprising:
    a substrate;
    a coating layer including a Si—O group-containing material on one surface or both surfaces of the substrate; and
    an intermediate interface layer between the substrate and the coating layer,
    wherein a thickness of the intermediate interface layer is 1/50 to 1/5 of the thickness of the coating layer.

2. The laminate of claim 1, wherein
    the Si—O group-containing material includes silsesquioxane, and
    the intermediate interface layer includes silsesquioxane and materials constituting the substrate.

3. The laminate of claim 2, wherein
    the silsesquioxane includes a SiOR functional group, and
    the intermediate interface layer includes a SiOR functional group and materials constituting the substrate.

TABLE 28

| | Thickness of intermediate interface layer (nm) | | | | | | | | | |
|---|---|---|---|---|---|---|---|---|---|---|
| | 0 | 5 | 10 | 500 | 2000 | 5000 | 8000 | 10,000 | 11,000 | 12,000 |
| Adherence | 50 | 80 | 97 | 100 | 100 | 100 | 100 | 100 | 100 | 100 |
| Bending capabilities | 30R | 20R | 15R | 15R | 13R | 13R | 15R | 15R | 20R | 30R |
| Transparency | 0.23 | 0.27 | 0.24 | 0.25 | 0.27 | 0.24 | 0.30 | 0.34 | 0.7 | 1.4 |
| Hardness | H | 4H | 6H | 7H | 9H | 9H | 9H | 9H | 9H | 9H |

4. The laminate of claim 3, wherein the intermediate interface layer includes a SiOR functional group and materials constituting the substrate, and a composition ratio of the intermediate interface layer has a continuously-changing composition ratio of the SiOR functional group and materials constituting the substrate from the coating layer to the substrate.

5. The laminate of claim 4, wherein the composition ratio of the intermediate interface layer has a decreased composition ratio of SiOR and an increased composition ratio of the materials constituting a substrate from the coating layer to the substrate.

6. The laminate of claim 2, wherein the silsesquioxane includes at least one of

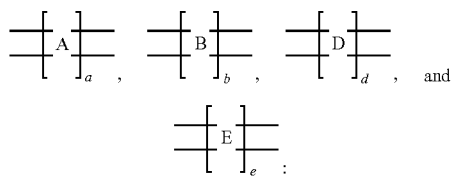, and

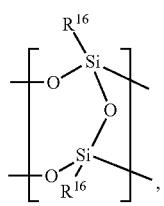:

A is

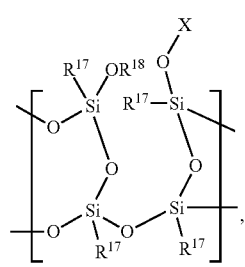,

B is

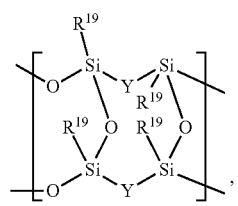,

D is

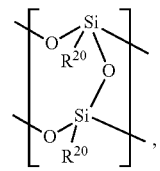

and E is

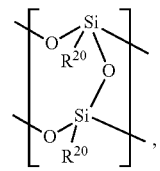,

Y is independently O, $NR^{21}$, or $[(SiO_{3/2}R)_{4+2n}O]$, provided that at least one is $[(SiO_{3/2}R)_{4+2n}O]$, X is independently $R^{22}$ or $[(SiO_{3/2}R)_{4+2n}R]$, provided that at least one is $[(SiO_{3/2}R)_{4+2n}R]$, R, $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$ and $R^{22}$ are independently hydrogen; deuterium; a halogen; an amine group; an epoxy group; a cyclohexylepoxy group; a (meth)acryl group; a thiol group; an isocyanate group; a nitrile group; a nitro group; a phenyl group; a $C_1$-$C_{40}$ alkyl group, a $C_2$-$C_{40}$ alkenyl group, a $C_1$-$C_{40}$ alkoxy group, a $C_3$-$C_{40}$ cycloalkyl group, a $C_3$-$C_{40}$ heterocycloalkyl group, a $C_6$-$C_{40}$ aryl group, a $C_3$-$C_{40}$ heteroaryl group, a $C_3$-$C_{40}$ aralkyl group, a $C_3$-$C_{40}$ aryloxy group, or a $C_3$-$C_{40}$ arylthiol group that are substituted or unsubstituted with hydrogen, deuterium, a halogen, an amine group, an epoxy group, a (meth) acryl group, a thiol group, an isocyanate group, a nitrile group, a nitro group, or a phenyl group, a and d are independently an integer ranging from 1 to 100,000, b is independently an integer ranging from 1 to 500, e is independently 1 or 2, and n is independently an integer ranging from 1 to 20.

7. The laminate of claim 6, wherein the silsesquioxane includes

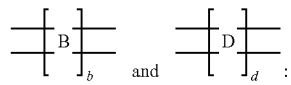:

wherein B

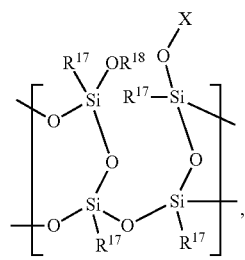

is D is

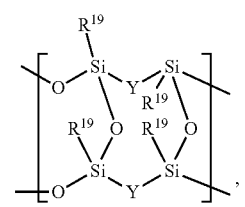, $R^{17}$, $R^{18}$, and $R^{19}$ are independently hydrogen; deuterium; a halogen; an amine group; an epoxy group; a cyclohexylepoxy group; a (meth)acryl group; a thiol group; an isocyanate group; a nitrile group; a nitro group; a phenyl group; a $C_1$-$C_{40}$ alkyl group, a $C_2$-$C_{40}$ alkenyl group, a $C_1$-$C_{40}$ alkoxy group, a $C_3$-$C_{40}$ cycloalkyl group, a $C_3$-$C_{40}$ heterocycloalkyl group, a $C_6$-$C_{40}$ aryl group, a $C_3$-$C_{40}$ heteroaryl group, a $C_3$-$C_{40}$ aralkyl group, a $C_3$-$C_{40}$ aryloxy group, or a $C_3$-$C_{40}$ arylthiol group that are substituted or unsubstituted with hydrogen, deuterium, a halogen, an amine group, an epoxy group, a (meth)acryl group, a thiol group, an isocyanate group, a nitrile group, a nitro group, or a phenyl group, b is independently an integer ranging from 1 to 500, and d is independently an integer ranging from 1 to 100,000.

8. The laminate of claim 2, wherein the silsesquioxane is represented by one of Chemical Formulae 1 to 9:

[Chemical Formula 1]
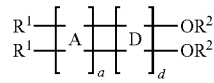

[Chemical Formula 2]
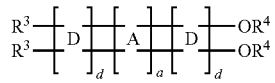

[Chemical Formula 3]
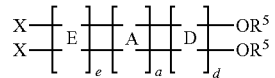

[Chemical Formula 4]
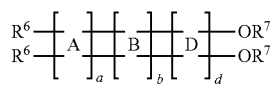

[Chemical Formula 5]
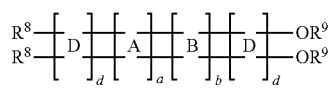

[Chemical Formula 6]
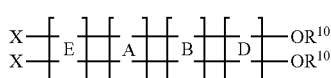

[Chemical Formula 7]
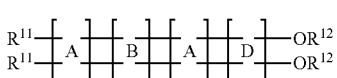

[Chemical Formula 8]
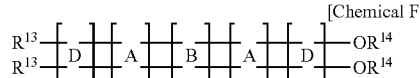

-continued

[Chemical Formula 9]
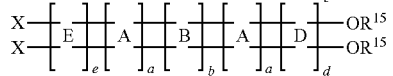

wherein, in Chemical Formulae 1 to 9,

A is

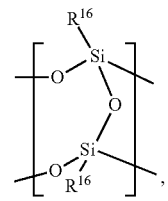

B is

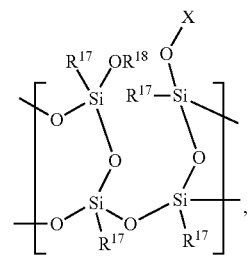

D is

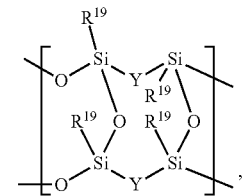

and E is

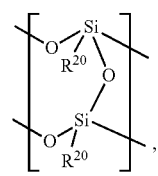

Y is independently O, $NR^{21}$, or $[(SiO_{3/2}R)_{4+2n}O]$, provided that at least one is $[(SiO_{3/2}R)_{4+2n}O]$, X is independently $R^{22}$ or $[(SiO_{3/2}R)_{4+2n}R]$, provided that at least one is $[(SiO_{3/2}R)_{4+2n}R]$, R, $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ are independently hydrogen; deuterium; a halogen; an amine group; an epoxy group; a cyclohexylepoxy group; a (meth)acryl group; a thiol group; an isocyanate group; a nitrile group; a nitro group; a phenyl group; a $C_1$-$C_{40}$ alkyl group, a $C_2$-$C_{40}$ alkenyl group, a $C_1$-$C_{40}$ alkoxy group, a $C_3$-$C_{40}$ cycloalkyl group, a $C_3$-$C_{40}$ heterocycloalkyl group, a $C_6$-$C_{40}$ aryl group, a $C_3$-$C_{40}$ heteroaryl group, a $C_3$-$C_{40}$ aralkyl group, a $C_3$-$C_{40}$ aryloxy group, or a $C_3$-$C_{40}$ arylthiol group that are substituted or unsubstituted with hydrogen, deuterium, a halogen, an amine group, an epoxy group, a (meth) acryl group, a thiol group, an isocyanate group, a nitrile group, a nitro group, or a phenyl group, a and d are independently an integer ranging from 1 to 100,000, b is independently an integer ranging from 1 to 500, e is independently 1 or 2, n is independently an integer ranging from 1 to 20, and known chain units applicable to the silsesquioxane can be further included between the each chain unit.

9. The laminate of claim 1, wherein a thickness of the coating layer is 0.1 μm-500 μm.

10. The laminate of claim 1, wherein a thickness of the intermediate interface layer is 10 nm-10,000 nm.

11. The laminate of claim 1, wherein the substrate is glass, or an organic or inorganic plastic.

12. The laminate of claim 1, wherein the laminate has bending capabilities of 15R or less.

13. The laminate of claim 1, wherein the coating layer has adherence to the substrate of 99 or greater.

14. A method of producing a laminate, comprising simultaneously forming an intermediate interface layer and a coating layer on one surface or both surfaces of a substrate, through:

(1) coating a coating composition including a Si—O group-containing material on one surface or both surfaces of the substrate; and (2) drying or curing the coated laminate, wherein a thickness of the intermediate interface layer is 1/50 to 1/5 of the thickness of the coating layer.

15. The method of producing a laminate of claim 14, wherein the Si—O group-containing material is silsesquioxane including SiOR.

16. The method of producing a laminate of claim 14, wherein the intermediate interface layer and the coating layer are formed by coating once.

17. The method for producing the laminate of claim 15, wherein the coating composition further comprises at least one of a) an organic solvent having compatibility with the silsesquioxane, b) an initiator, and c) a hardener.

18. The method for producing the laminate of claim 15, wherein the coating composition further includes at least one of a curing accelerator, a plasticizer, and an ultraviolet (UV) blocking agent.

* * * * *